US010392485B2

(12) United States Patent
Ishimaru et al.

(10) Patent No.: US 10,392,485 B2
(45) Date of Patent: Aug. 27, 2019

(54) HEAT-SHRINKABLE POLYESTER-BASED FILM AND PACKAGE

(71) Applicant: TOYOBO CO., LTD., Osaka-shi, Osaka (JP)

(72) Inventors: Shintaro Ishimaru, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 156 days.

(21) Appl. No.: 15/559,030

(22) PCT Filed: Mar. 9, 2016

(86) PCT No.: PCT/JP2016/057319
§ 371 (c)(1),
(2) Date: Sep. 15, 2017

(87) PCT Pub. No.: WO2016/152517
PCT Pub. Date: Sep. 29, 2016

(65) Prior Publication Data
US 2018/0079877 A1  Mar. 22, 2018

(30) Foreign Application Priority Data
Mar. 20, 2015  (JP) .................................. 2015-057685

(51) Int. Cl.
*B29D 7/01* (2006.01)
*C08J 5/18* (2006.01)
(Continued)

(52) U.S. Cl.
CPC .............. *C08J 5/18* (2013.01); *B29C 55/005* (2013.01); *B29C 55/143* (2013.01); *B29D 7/01* (2013.01);
(Continued)

(58) Field of Classification Search
None
See application file for complete search history.

(56) References Cited

U.S. PATENT DOCUMENTS 7,829,655 B2 * 11/2010 Endo ..................... B29C 55/146
264/176.1
8,206,797 B2 * 6/2012 Haruta .................. B29C 61/003
428/35.1

(Continued)

FOREIGN PATENT DOCUMENTS

JP   H03-103432 A      4/1991
JP   2003-041024 A  *  2/2003
(Continued)

OTHER PUBLICATIONS

Japanese Patent Office, International Search Report in International Patent Application No. PCT/JP2016/057319 (dated May 24, 2016).

*Primary Examiner* — Vivian Chen
(74) *Attorney, Agent, or Firm* — Leydig, Voit & Mayer, Ltd.

(57) ABSTRACT

The invention provides a heat-shrinkable polyester-based film comprising ethylene terephthalate units, constituent units derived from at least one monomer which forms an amorphous component, and constituent units derived from butanediol. The amount of the constituent units derived from at least one monomer which forms an amorphous component is 18 mol % or more, and the amount of the constituent units derived from butanediol is 1 to 25 mol % based on 100 mol % of all polyester resin components. The heat-shrinkable polyester-based film is characterized by particular values for the secondary shrinkage ratio of the film, the hot-water heat shrinkage ratio of the film, and the reversing heat capacity difference before and after the glass transition temperature of the film.

12 Claims, 3 Drawing Sheets

(51) Int. Cl.
  *B29C 55/00* (2006.01)
  *B29C 55/14* (2006.01)
  *B29K 67/00* (2006.01)
  *B32B 27/36* (2006.01)
  *B65D 75/00* (2006.01)
  *C08G 63/08* (2006.01)
  *C08L 67/02* (2006.01)
  *C08L 67/03* (2006.01)
  *C08L 67/04* (2006.01)
  *B29K 105/00* (2006.01)
  *B29K 105/02* (2006.01)
  *C08G 63/183* (2006.01)

(52) U.S. Cl.
  CPC ...... *C08G 63/183* (2013.01); *B29K 2067/003* (2013.01); *B29K 2105/02* (2013.01); *B29K 2105/256* (2013.01); *B29K 2995/0049* (2013.01); *B32B 27/36* (2013.01); *B32B 2307/30* (2013.01); *B32B 2307/50* (2013.01); *B32B 2307/54* (2013.01); *B32B 2307/582* (2013.01); *B32B 2307/736* (2013.01); *B32B 2309/02* (2013.01); *B32B 2309/04* (2013.01); *B32B 2367/00* (2013.01); *B32B 2439/00* (2013.01); *B65D 75/00* (2013.01); *B65D 75/002* (2013.01); *C08G 63/08* (2013.01); *C08J 2367/02* (2013.01); *C08J 2467/02* (2013.01); *C08L 67/02* (2013.01); *C08L 67/03* (2013.01); *C08L 67/04* (2013.01); *Y10T 428/1328* (2015.01); *Y10T 428/1331* (2015.01); *Y10T 428/31786* (2015.04)

(56) References Cited

U.S. PATENT DOCUMENTS

| | | | | |
|---|---|---|---|---|
| 8,673,414 B2* | 3/2014 | Haruta | ........... | B29C 61/003 264/164 |
| 8,685,305 B2* | 4/2014 | Haruta | ........... | B29C 55/143 264/210.1 |
| 8,728,594 B2* | 5/2014 | Haruta | ........... | B29C 55/14 428/304.4 |
| 9,017,782 B2* | 4/2015 | Haruta | ........... | B29C 61/003 428/35.1 |
| 9,296,867 B2* | 3/2016 | Haruta | ........... | C08J 5/18 |
| 9,352,508 B2* | 5/2016 | Haruta | ........... | B29C 55/065 |
| 9,920,162 B2* | 3/2018 | Haruta | ........... | B29C 61/003 |
| 10,035,335 B2* | 7/2018 | Haruta | ........... | B29C 55/143 |
| 2009/0270584 A1* | 10/2009 | Endo | ........... | B29C 55/146 528/308.1 |
| 2009/0304997 A1* | 12/2009 | Haruta | ........... | B29C 61/003 428/156 |
| 2010/0247845 A1* | 9/2010 | Haruta | ........... | B29C 55/143 428/98 |
| 2010/0260951 A1* | 10/2010 | Haruta | ........... | B29C 55/143 428/35.1 |
| 2011/0306747 A1* | 12/2011 | Hashimoto | ........... | C08J 5/18 528/83 |
| 2012/0043248 A1* | 2/2012 | Haruta | ........... | B29C 55/065 206/497 |
| 2013/0008821 A1* | 1/2013 | Haruta | ........... | C08J 5/18 206/459.5 |
| 2016/0090456 A1* | 3/2016 | Ishimaru | ........... | C08J 5/18 428/131 |
| 2016/0137833 A1* | 5/2016 | Haruta | ........... | B29C 61/003 206/459.5 |
| 2018/0319539 A1* | 11/2018 | Haruta | ........... | B65D 23/08 |
| 2019/0077136 A1* | 3/2019 | Ishimaru | ........... | B32B 27/36 |

FOREIGN PATENT DOCUMENTS

| | | | |
|---|---|---|---|
| JP | 2005-335111 A | | 12/2005 |
| JP | 2009-226939 A | * | 10/2009 |
| JP | 4752360 B2 | | 8/2011 |
| JP | 2015-199337 A | * | 11/2015 |
| JP | 2015-199909 A | * | 11/2015 |
| WO | WO 2010/064811 A | * | 6/2010 |
| WO | WO 2014/185442 A1 | | 11/2014 |
| WO | WO 2015/151695 A | * | 10/2015 |
| WO | WO 2016/067658 A | * | 5/2016 |

* cited by examiner

[Fig.1]
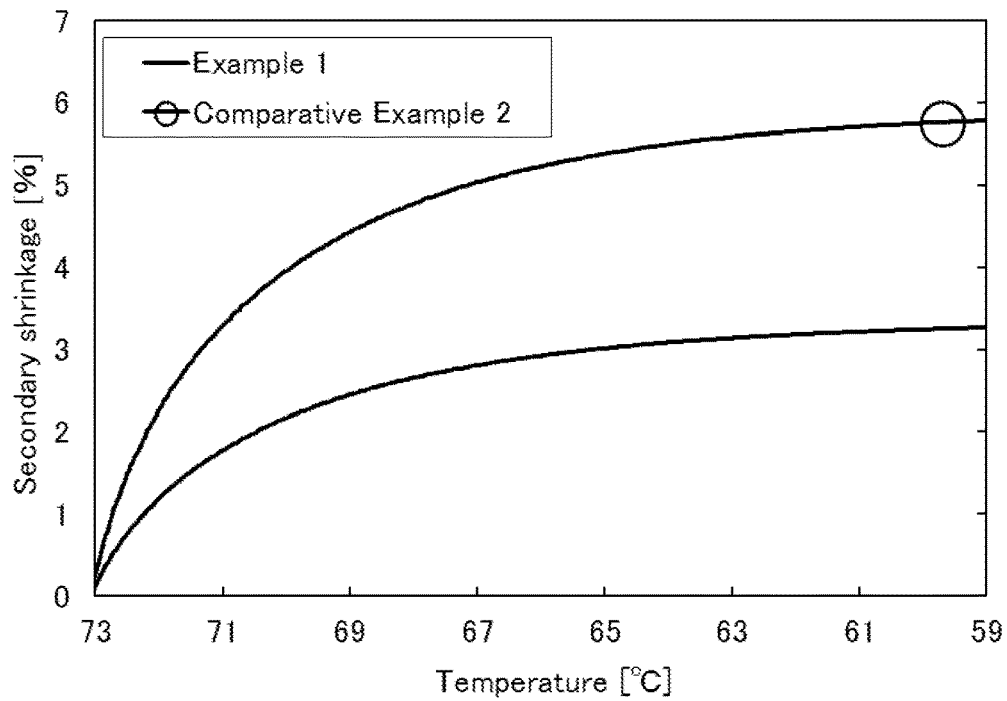
[Fig.2]
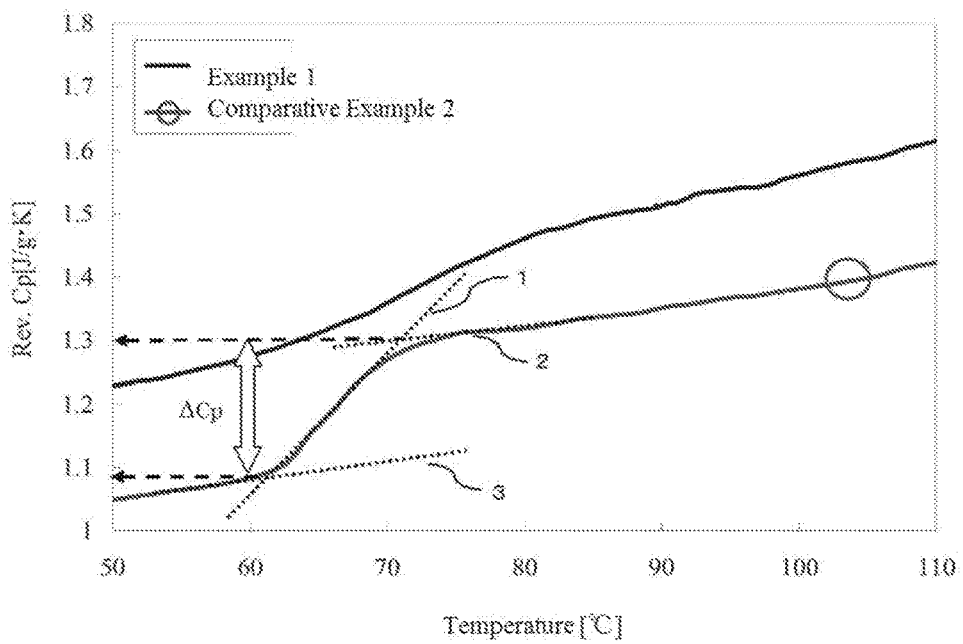

[Fig.3]
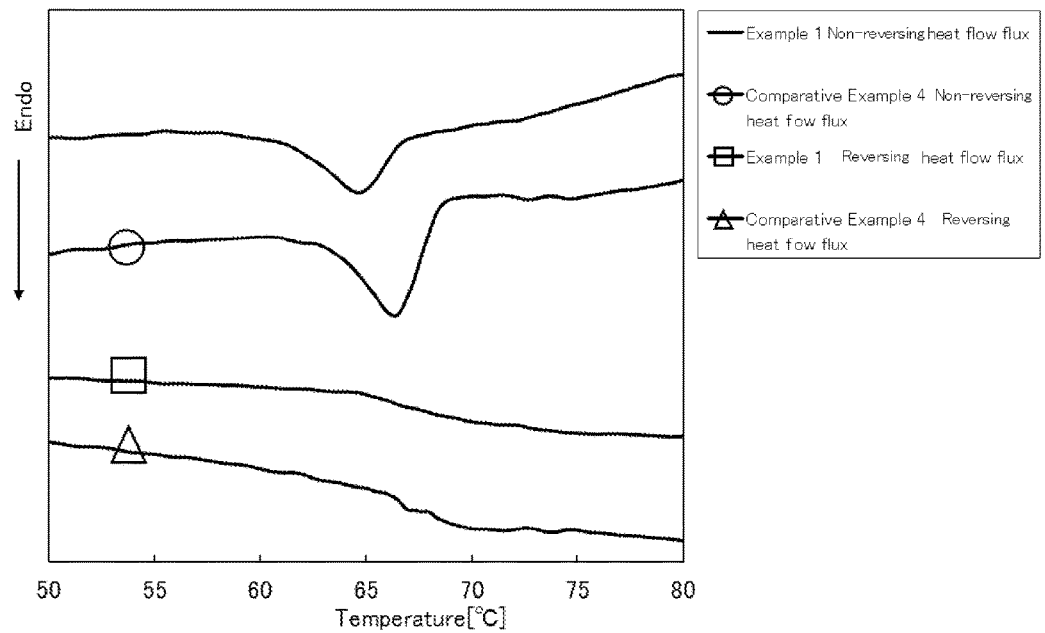
[Fig.4]
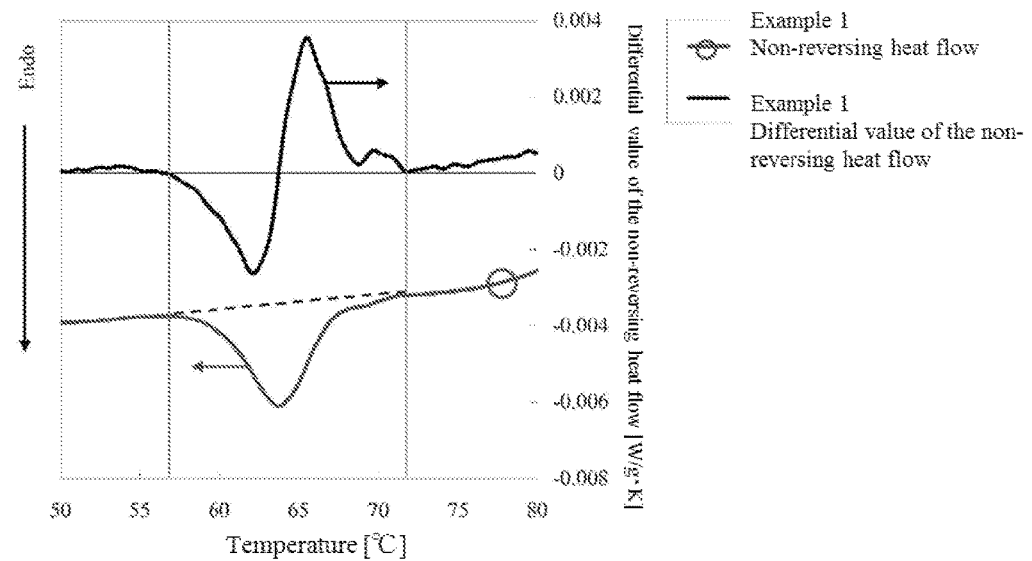

[Fig.5]
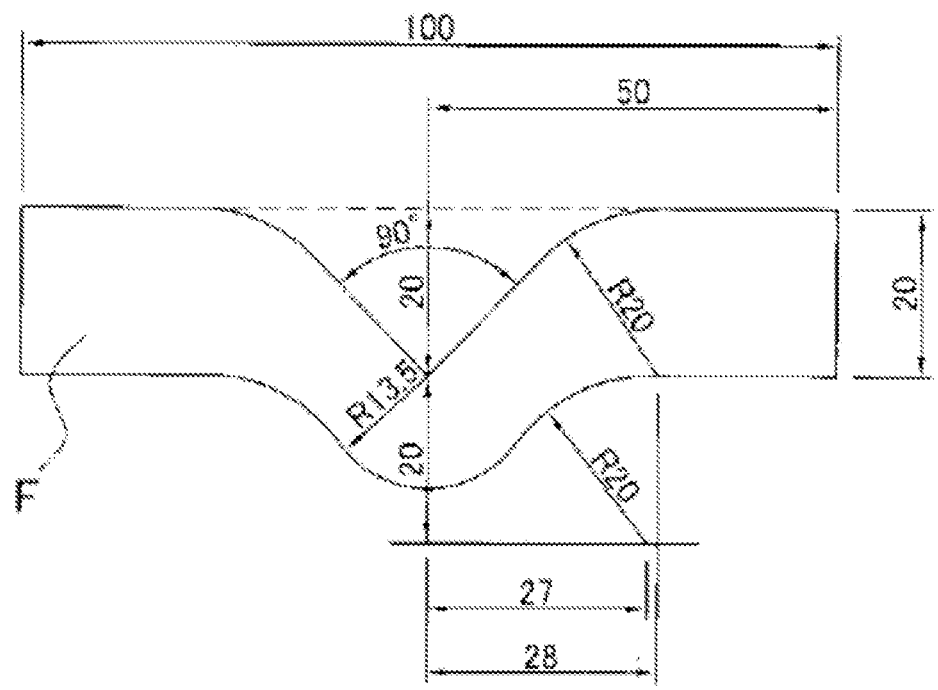
[Fig.6]
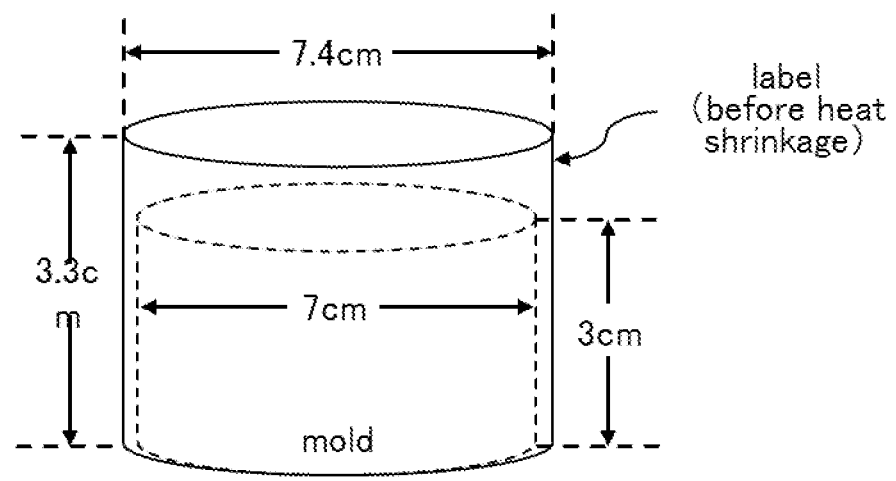

HEAT-SHRINKABLE POLYESTER-BASED FILM AND PACKAGE

CROSS-REFERENCE TO RELATED APPLICATIONS

This patent application is the U.S. national phase of International Patent Application No. PCT/JP2016/057319, filed Mar. 9, 2016, which claims the benefit of Japanese Patent Application No. 2015-057685, filed on Mar. 20, 2015, which are incorporated by reference in their entireties herein.

TECHNICAL FIELD

The present invention relates to a heat-shrinkable polyester-based film suitable for use in a heat-shrinkable label, and package.

BACKGROUND ART

In recent years, stretched films (i.e. heat-shrinkable films) composed of a polyvinyl chloride-based resin, a polystyrene-based resin or a polyester-based resin have come into wide use in packaging with a label serving to protect a glass bottle, a plastic bottle or the like and also display product information, cap sealing, assembly packaging, and so on. Among these heat-shrinkable films, polyvinyl chloride-based films have low heat resistance, and further, polyvinyl chloride-based films have problems that they generate a hydrogen chloride gas during incineration, cause generation of dioxin, and the like.

Polystyrene-based films have poor solvent resistance, so that an ink having a special composition must be used in printing, and further, polystyrene-based films have the problem that they are required to be incinerated at a high temperature, and thus a large amount of black smoke is generated along with an offensive smell during incineration. Thus, polyester-based heat-shrinkable films which have high heat resistance, are easily incinerated, and have excellent solvent resistance have come into wide use as shrinkable labels, and tended to be increasingly used with an increase in distribution amount of PET (polyethylene terephthalate) bottles etc.

However, conventional heat-shrinkable polyester-based films have been required to be further improved in their shrinkage property. Particularly, in comparison with a heat-shrinkable polystyrene-based film, a heat-shrinkable polyester-based film has the following problem: characters and pictures printed on the film may be distorted due to uneven shrinkage and generation of creases when a container such as a PET bottle, a polyethylene bottle or a glass bottle is covered with the film, and the film is shrunk. Users have desired that the distortion be reduced as much as possible.

In use of a heat-shrinkable film in covering processing of a container, pictures etc. are printed on the film as necessary, the film is then processed into the form of a label, a bag or the like, and attached to the container, and the label or the like is heat-shrunk, and attached to the container using a heating apparatus called a shrinkage tunnel. Such the shrinkage tunnel includes a steam tunnel which heat-shrink the film by blowing steam, and a hot air tunnel which heat-shrink the film by blowing hot air.

As compared to the hot air tunnel, the steam tunnel has higher heat transfer efficiency, and is capable of heat-shrinking the film more uniformly, so that a favorable finished external appearance can be obtained. However, polyester-based films have the problem that even when a steam tunnel is used, they are slightly inferior in finish property to polyvinyl chloride-based films and polystyrene-based films.

Further, when a polyester-based film is shrunk using a hot air tunnel in which temperature unevenness more easily occurs as compared to a steam tunnel, there is the problem that whitening in shrinkage, uneven shrinkage, generation of creases, distortion and so on easily occur, and thus the polyester-based film is inferior in finish property to a polyvinyl chloride-based film and a polystyrene-based film.

In view of the problems described above, for example, a method has been suggested in which a polyester-based elastomer is included in a polyester resin as a film raw material for improving the shrinkage finish property of a heat-shrinkable polyester-based film (Patent Document 1).

However, the heat-shrinkable polyester-based film described in Patent Document 1 has the problem that use of the film as a label for an easily thermally expandable bottle made of polyethylene or the like is not preferable from the viewpoint of performance and external appearance because even when the label is adhered to the bottle during heating and shrinkage, the bottle is cooled to approximately room temperature, so that the bottle expanded during heating returns to its usual size, and therefore the label is slacken. The heat-shrinkable polyester-based film in Patent Document 1 also has the problem that the film is hardly stretched in a longitudinal direction, a direction orthogonal to a traverse direction as a main shrinkage direction, and therefore has low mechanical strength in the longitudinal direction, and poor perforation opening property.

After application of Patent Document 1, the applicant of this application subsequently conducted studies on perforation opening property, and a heat-shrinkable polyester-based film having excellent perforation opening property as shown in Patent Document 2 was successfully provided.

However, there is still room for improvement in shrinkage finish property. In a hot air tunnel to be used in a preform for cap sealing, the size of equipment is often relatively small in accordance with its specifications, and there is the problem that finish property is deteriorated because a mold is not sufficiently cooled in a cooling step after a film passes through the tunnel. Thus, when the heat-shrinkable film in Patent Document 2 is used, the film is continuously shrunk by remaining heat in the mold (hereinafter, this phenomenon is referred to as secondary shrinkage), and therefore the preform loses its shape.

PRIOR ART DOCUMENTS

Patent Documents

Patent Document 1; Japanese unexamined patent application publication No. 2005-335111
Patent Document 2; WO2014/185442
Patent Document 3; Japanese patent No. 4752360

SUMMARY OF THE INVENTION

Problems to be Solved by the Invention

In view of the problems described above, an object of the present invention is to provide a heat-shrinkable polyester-based film with shrinkage finish property improved by suppressing secondary shrinkage.

Solutions to the Problems

The present invention includes the following constituents;

1. A heat-shrinkable polyester-based film comprising ethylene terephthalate units, constituent units derived at least one monomer which forms an amorphous component and constituent units derived from butanediol, wherein an amount of the constituent units derived at least one monomer which forms an amorphous component are 18 mol % or more and an amount of the constituent units derived from butanediol are 1 to 25 mol % based on 100 mol % of all polyester resin components, wherein the heat-shrinkable polyester-based film satisfies the following requirements (1) to (3);

(1) the secondary shrinkage ratio of the film is 2% or more and 5% or less when the film is cooled to 25° C. from 100° C. after being primarily shrunk in a chamber kept at 100° C. beforehand;

(2) the hot-water heat shrinkage ratio of the film in the traverse direction is 10% or more and 30% or less when the film is dipped in hot water at 70° C. for 10 seconds after being aged under an atmosphere at 30° C. and 85% RH for 672 hours; and (3) the reversing heat capacity difference before and after the glass transition temperature of the film is 0.12 J/g·° C. or more and 0.25 J/g·° C. or less when the reversing heat capacity difference is measured by temperature-modulated DSC.

2. The heat-shrinkable polyester-based film according to above 1, wherein the film further comprise constituent units derived from ε-caprolactone and constituent units derived from at least one monomer which forms an amorphous component, other than constituent units derived from butanediol and ε-caprolactone, wherein an amount of the constituent units derived from ε-caprolactone are 1 to 25 mol % and an amount of the constituent units derived from at least one monomer which forms an amorphous component, other than constituent units derived from butanediol and ε-caprolactone are 18 mol % or more based on 100 mol % of all polyester resin components.

3. The heat-shrinkable polyester-based film according to above 1 or 2, wherein the hot-water heat shrinkage ratio of the film in the longitudinal direction is −1% or more and 5% or less when the film is dipped in hot water at 70° C. for 10 seconds.

4. The heat-shrinkable polyester-based film according to any one of above 1 to 3, wherein a ratio A1/A2 (absorbance ratio) of an absorbance A1 at 1340 cm-1 to an absorbance A2 at 1410 cm-1 when each absorbance is measured by a polarized ATR-FTIR method is 0.5 or more and 0.75 or less in the traverse direction and 0.35 or more and 0.55 or less in the longitudinal direction.

5. The heat-shrinkable polyester-based film according to any one of above 1 to 4, wherein the tensile fracture strength in the longitudinal direction is 80 MPa or more and 200 MP or less.

6. The heat-shrinkable polyester-based film according to any one of above 1 to 5, wherein the right-angle tear strength per unit thickness in the film longitudinal direction is 180 N/mm or more and 330 N/mm or less after the film is shrunk by 10% in the traverse direction in hot water at 80° C.

7. A package obtained by covering at least a part of an outer periphery of a product to be packaged with the heat-shrinkable film according to any one of above 1 to 6, and then heat-shrinking the heat-shrinkable film.

Effects of the Invention

According to a heat-shrinkable polyester-based film of the present invention, a polyester having a specific composition is formed into a film by a specific production method, so that a polyester molecular chain forming the film, particularly an amorphous molecular chain (hereinafter, sometimes referred to simply as a molecular chain) supposed to be involved in shrinkage, is quickly relaxed during heat shrinkage, and therefore secondary shrinkage can be suppressed to obtain a package having excellent shrinkage finish property.

Since the heat-shrinkable polyester-based film of the present invention has such a property that a molecular chain is hardly relaxed before heat shrinkage and during aging, performance deterioration during aging is small, and a package having excellent shrinkage finish property is obtained even when a film after aging is used. Further, since the heat-shrinkable polyester-based film of the present invention is produced by biaxially stretching a film in lengthwise and lateral directions, it can be very efficiently produced, and suitably used in cap sealing, shrinkage packaging and so on.

BRIEF DESCRIPTION OF THE DRAWINGS

FIG. 1 shows secondary shrinkage curves for films in Example 1 and Comparative Example 2.

FIG. 2 shows reversing heat capacity curves measured by temperature-modulated DSC for films in Example 1 and Comparative Example 2.

FIG. 3 shows reversing heat flows and non-reversing heat flows measured by temperature-modulated DSC for films in Example 1 and Comparative Example 4.

FIG. 4 shows a non-reversing heat flow measured by temperature-modulated DSC and a differential curve thereof for the film in Example 1.

FIG. 5 is an explanatory view showing a shape of a test piece in measurement of right-angle tear strength (the length of each portion of the test piece is shown in a unit of mm, and R represents a radius).

FIG. 6 is a schematic view where a label prepared from a heat-shrinkable film is attached to a mold (before shrinkage).

MODE FOR CARRYING OUT THE INVENTION

1. Raw Material Polyester for Heat-Shrinkable Polyester-Based Film

A polyester to be used in a heat-shrinkable polyester-based film of the present invention has ethylene terephthalate units. An amount of ethylene terephthalate units is preferably 40 mol % or more, more preferably 50 mol % or more, still more preferably 55 mol % or more based on 100 mol % of constituent units of the polyester.

In this specification, the constituent unit means monomer units in polyhydric alcohols and polycarboxylic acids that form a copolymer, and polyhydric alcohol components include butanediol and ε-caprolactone.

It is important that the heat-shrinkable polyester-based film of the present invention contains 1 to 25 mol % of constituent units derived from butanediol (1,4-butanediol) and 1 to 25 mol % of constituent units derived from ε-caprolactone based on 100 mol % of total polyester resin components. Due to use of butanediol and ε-caprolactone in combination and employment of a stretching method as described later, stress on a polyester molecular chain extended to a certain degree by stretching before heat shrinkage is hardly relaxed even during aging, and therefore it is able to provide a film in which the heat shrinkage ratio in a low-temperature range (hereinafter, referred to as "low-temperature shrinkability") is hardly reduced.

Heretofore, there has been the problem that shrinkage performance of a film during aging is deteriorated when the amount of amorphous components in a polyester is increased for securing low-temperature shrinkability, but the heat-shrinkable film of the present invention has such a characteristic that stress on an amorphous molecular chain before heat shrinkage is hardly relaxed, and therefore a low-temperature shrinkage ratio can be secured.

It is considered that the above-mentioned effects are exhibited because as polyhydric alcohol components, components having different numbers of molecular main chain carbon atoms, such as butanediol and ε-caprolactone coexist in addition to ethylene glycol, and film formation is performed by a biaxial stretching method. For the heat-shrinkable polyester-based film, it is considered that while there exist a large number of molecular main chains between two ester bonds in the polyester, and the molecular main chains are extended by stretching, or stressed, or the stress is relaxed, butanediol and ε-caprolactone have a molecular main chain longer than that of ethylene glycol, and these molecular main chains having different lengths take mutually different behaviors in stretching and stress relaxation. And it is also considered that by biaxially stretching the film, molecular main chains having different lengths are biaxially oriented in the film plane, and a distribution is generated in energy required for relaxation of stress for each of polyester molecular chains. It is supposed that even though the same amount of energy is given to this heat-shrinkable polyester-based film of the present invention, stress on a large number of molecular chains is not uniformly relaxed in the overall film, and therefore enthalpy relaxation during aging is gentle. Owing to these mechanisms, the film may exhibit the effect of excellent shrinkage finish property even when it is heat-shrunk after aging.

When the amounts of butanedione and ε-caprolactone are each smaller than 1 mol % based on 100 mol % of alcohol components, the film fails to exhibit relaxation suppressing effect, leading to insufficient shrinkage and poor shrinkage finish property. It is not preferable the amounts of butanedione and ε-caprolactone are each larger than 25 mol % because the amount of ethylene terephthalate units carrying physical strength is relatively small, resulting in insufficient breakage resistance, film strength, heat resistance and the like. The amount of each of butanediol and ε-caprolactone is preferably 5 mol % or more. The amount of ε-caprolactone is preferably 20 mol % or less. The total amount of butanediol and ε-caprolactone is preferably 45 mol % or less. This is because a situation can be prevented in which the amount of ethylene terephthalate units is extremely small, so that heat resistance and strength are reduced.

In the polyester according to the present invention, the amount (total amount) of units derived from at least one monomer, which forms an amorphous component, other than units derived from butanediol and ε-caprolactone is 18 mol % or more based on 100 mol % of all polyester resin components. When the amount of amorphous components is smaller than 18 mol %, the film has poor heat shrinkage property. The amount of monomers which forms amorphous components is preferably 20 mol % or more and 25 mol % or less based on 100 mol % of polyhydric alcohol components or 100 mol % of polycarboxylic acid components in the total polyester resin.

Specific examples of the monomer which forms an amorphous component includes neopentyl glycol, 1,4-cyclohexane dim ethanol, isophthalic acid, 1,4-cyclohexanedicarboxylic acid, 2,6-naphthalenedicarboxylic acid, 1,3-propanediol, 2,2-diethyl-1,3-propanediol, 2-n-butyl-2-ethyl-1,3-propanediol, 2,2-isopropyl-1,3-propanediol, 2,2-di-n-butyl-1,3-propanediol and hexanediol. Among them, neopentyl glycol, 1,4-cyclohexanedimethanol and isophthalic acid are preferable.

When the monomer which forms an amorphous component is isophthalic acid, terephthalic acid and isophthalic acid are used in combination as dicarboxylic acid components, and ethylene glycol, butanediol and ε-caprolactone are used in combination as diol components, constituent units consisting of terephthalic acid and butanediol, constituent units consisting of isophthalic acid and butanediol, and constituent units consisting of isophthalic acid and ethylene glycol coexist in the polyester resin that forms the film.

Here, the constituent unit consisting of isophthalic acid and butanediol is a constituent unit derived from butanediol, and is also a constituent unit derived from at least one monomer which forms an amorphous component. Thus, in the present invention, the content of constituent units consisting of isophthalic acid and butanediol is counted as a content of constituent units derived from butanediol, and also counted as a content of constituent units derived from at least one monomer which forms an amorphous component. Therefore, the content of constituent units derived from butanediol is the total of the content of constituent units consisting of isophthalic acid and butanediol and the content of constituent units consisting of terephthalic acid and butanediol. The content of constituent units derived from at least one monomer which forms an amorphous component is the total of the content of constituent units derived from at least one monomer which forms all amorphous components, including the content of constituent units consisting of isophthalic acid and butanediol and the content of constituent units consisting of isophthalic acid and ethylene glycol. The same applies to the relationship between the content of constituent units derived from ε-caprolactone and the content of constituent units derived from at least one monomer which forms an amorphous component.

Examples of the dicarboxylic acid component other than the above-mentioned dicarboxylic acid components, which forms the polyester according to the present invention, include aromatic dicarboxylic acids such as ortho-phthalic acid; aliphatic dicarboxylic acids such as adipic acid, azelaic acid, sebacic acid and decanedicarboxylic acid; and cycloaliphatic dicarboxylic acids.

When the polyester contains the aliphatic dicarboxylic acid (e.g. adipic acid, sebacic acid, decanedicarboxylic acid or the like), the content of the aliphatic dicarboxylic acid is preferably less than 3 mol % (based on 100 mol % of dicarboxylic acid components). A heat-shrinkable polyester-based film obtained using a polyester containing 3 mol % or more of such an aliphatic dicarboxylic acid has insufficient film stiffness at the high-speed attachment.

Preferably, the polyester does not contain a polycarboxylic acid having a valence number of 3 or more (e.g. trimellitic acid, pyromellitic acid or anhydride thereof). A heat-shrinkable polyester-based film obtained using a polyester containing such a polycarboxylic acid is hard to attain a required high shrinkage ratio.

Examples of the polyhydric alcohol component other than the above-mentioned polyhydric alcohols, which forms the polyester, include aromatic diols such as bisphenol A.

The polyester for use in the present invention is preferably a polyester adjusted to have a glass transition point (Tg) of 50 to 80° C. by appropriately selecting the amounts of butanediol and ε-caprolactone, and amount of the monomer which forms an amorphous component.

Preferably, the polyester does not contain a diol having 8 or more carbon atoms (e.g. octanediol), or a polyhydric alcohol having a valence number of 3 or more (e.g. trimethylolpropane, trimethylolethane, glycerin or diglycerin). A heat-shrinkable polyester-based film obtained using a polyester containing such a diol or polyhydric alcohol is hard to attain a required high shrinkage ratio. Preferably, the polyester does not contain diethylene glycol, triethylene glycol or polyethylene glycol where possible.

The polyester is most preferably a polyester in which based on 100 mol % of all polyester constituent units, the amount of butylene terephthalate units is 1 to 25 mol %, the amount of units including ε-caprolactone and terephthalic acid is 1 to 25 mol %, the total amount of these units is 2 to 50 mol %, the amount of units including terephthalic acid, and a monomer which forms an amorphous component is 18 to 25 mol %, and ethylene terephthalate units constitute the balance. The polyester may contain amorphous units with terephthalic acid partially replaced by isophthalic acid.

Various kinds of additives such as waxs, an antioxidant, an antistatic agent, a crystal nucleating agent, a thinner, a heat stabilizer, a coloring pigment, a coloring inhibitor and an ultraviolet absorber may be added in the heat-shrinkable polyester-based film of the present invention as necessary.

Preferably, fine particles as a lubricant for improving film operability (slipperiness) are added in the heat-shrinkable polyester-based film of the present invention as necessary. As the fine particles, any fine particles can be selected, and examples thereof may include inorganic fine particles such as those of silica, alumina, titanium dioxide, calcium carbonate, kaolin and barium sulfate; and organic fine particles such as acryl-based resin particles, melamine resin particles, silicone resin particles and crosslinked polystyrene particles. The average particle size of the fine particles can be appropriately selected as necessary within a range of 0.05 to 3.0 μm (as measured by a coulter counter).

As a method for blending the particles in the resin that forms the heat-shrinkable polyester-based film, for example, the particles can be added in any stage in production of the polyester-based resin, and it is preferable that during esterification, or after completion of ester exchange reaction and before the start of polycondensation reaction, the particles are added as a slurry with the particles dispersed in ethylene glycol or the like, and the polycondensation reaction is carried out. It is also preferable that the particles are blended in the resin by a method in which a slurry of particles dispersed in ethylene glycol, water or the like is blended with a polyester-based resin raw material using a kneading extruder with a vent, or a method in which dried particles are blended with a polyester-based resin raw material using a kneading extruder.

The heat-shrinkable polyester-based film of the present invention can be subjected to corona treatment, coating treatment, flame treatment or the like for improving bondability to a film surface.

2. Properties of Heat-Shrinkable Polyester-Based Film of the Present Invention 2.1 Secondary Shrinkage It is important that the heat-shrinkable polyester-based film of the present invention (which is not placed under an aging atmosphere) has a secondary shrinkage ratio of 2% or more and 5% or less as measured when the film is cooled to 25° C. from 100° C. after being primarily shrunk in a chamber kept at 100° C. beforehand. The heat-shrinkable polyester-based film of the present invention has such heat-shrinkable properties that the film is hardly shrunk in a cooling step after heating in shrinkage finish (Example 1 in FIG. 1). In FIG. 1, the abscissa represents a film temperature after cooling is started. A step of primarily shrinking the film in a chamber kept at 100° C., and then cooling the film from 100° C. to 25° C. is carried out as described above. Here, in FIG. 1, the film temperature on the abscissa shifts to the right from the origin as the film is cooled in the cooling step, and it can be confirmed that the secondary shrinkage ratio after cooling is 5% or more in Comparative Example 2. When the secondary shrinkage ratio is more than 5%, the film is continuously shrunk even during cooling after being heated and shrunk, and the film is shrunk even after removal of a preform from a mold, and loses its shape. The secondary shrinkage ratio is more preferably 4.8% or less, still more preferably 4.6% or less. The secondary shrinkage ratio is preferably as small as possible because finish property is improved, but it is not preferable that the secondary shrinkage ratio is less than 2% because it is difficult to achieve shrinkage property required for shrinkage finish. The secondary shrinkage ratio is preferably 2.2% or more, more preferably 2.4% or more.

2.2 Hot-Water Heat Shrinkage Ratio at 70° C. in Film Traverse Direction after Aging Deterioration of performance of the heat-shrinkable polyester-based film of the present invention during aging is small, and therefore when the film is aged under an atmosphere at 30° C. and 85% RH for 672 hours, the aged film is then dipped in hot water at 70° C. under a no-load condition for 10 seconds, the film is immediately dipped in water at 25° C.±0.5° C. for 10 seconds, and a heat shrinkage ratio (i.e. hot-water heat shrinkage ratio at 70° C.) in the film traverse direction (main shrinkage direction) is then calculated in accordance with the following formula 1 from the lengths before and after shrinkage, the heat shrinkage ratio is 10% or more and 30% or less.

Hot-water heat shrinkage ratio={(length before shrinkage−length after shrinkage)/length before shrinkage}×100(%).  Formula 1

When the hot-water heat shrinkage ratio at 70° C. in the film traverse direction is less than 10%, the film is not finely adhered to a mold because of insufficient shrinkage strength of the film at the time of covering the mold etc. with the film and shrinking the film, and thus the film has a poor external appearance. It is not preferable that the hot-water heat shrinkage ratio at 70° C. in the film traverse direction is more than 30% because the secondary shrinkage ratio increases. The hot-water heat shrinkage ratio at 70° C. is preferably 12% or more, more preferably 14% or more, and preferably 28% or less, more preferably 26% or less.

2.3 Mobile Amorphous Content

In the heat-shrinkable polyester-based film of the present invention, a reversing heat capacity difference serving as an indication of a mobile amorphous content around a glass transition temperature (Tg) of the heat-shrinkable polyester-based film as measured in a heat-only mode by temperature-modulated DSC must be 0.12 J/g·° C. or more and 0.25 J/g·° C. or less. Hereinafter, the concept of "mobile amorphous" will be described.

Heretofore, it has been thought that the high-order structure of molecules forming a film is divided into a crystalline structure and an amorphous structure, and the amorphous structure is involved in shrinkage of the film. Thus, a method has been employed in which the amount of monomer components forming units that forms an amorphous structure (hereinafter, referred to simply as an amorphous component) is adjusted for controlling the shrinkage property of a heat-shrinkable film. It has been recognized that by increasing the amorphous component amount, a shrinkage ratio increase matching the increase of the amorphous component amount is attained in a film obtained by a uniaxial stretching method being a conventional method for forming a heat-shrinkable film. However, it has been found that even by increasing the amorphous component amount, a shrinkage ratio increase matching the increase of the amorphous component amount is not attained in, for example, the heat-shrinkable film described in Patent Document 3. Further, studies conducted by the present inventors have shown that there is almost no correlation between the crystallinity degree and the heat shrinkage ratio or between the melting heat and the heat shrinkage ratio. These facts suggest that a polyester is not divided into two phases: a crystalline phase and an amorphous phase, but is divided into three phases: a crystalline phase, a mobile amorphous phase and a rigid amorphous phase.

The "rigid amorphous" means a middle state between "crystalline" and "mobile amorphous" (conventionally referred to as "complete amorphous"), i.e. an amorphous state in which molecular motion is frozen even at a temperature equal to or higher than Tg, and molecules are fluidized at a temperature higher than Tg (e.g. Minoru Totoki, "DSC (3)-Glass Transition Behavior of Polymer-", Journal of The Society of Fiber Science and Technology, Japan (Fiber and Industry), Vol. 65, No. 10 (2009)). The rigid amorphous content (ratio) can be expressed by 100%–crystallinity degree–mobile amorphous content (e.g. P. G. Karagiannidis, a. C. Stergiou and G. P. Karayannidis, Eur. Polym. J. 44, 1475-1486 (2008)).

Examination of a relationship between the mobile amorphous content and the secondary shrinkage ratio has revealed that there is a correlation between the mobile amorphous content and the secondary shrinkage ratio. Further, the result of measuring the mobile amorphous content for unstretched sheets, films after lateral stretching, films after final heat treatment and so on has showed that among the films after lateral stretching and the films after final heat treatment, films with the mobile amorphous content unchanged from the in the unstretched film have a high secondary shrinkage ratio, suggesting that the mobile amorphous phase is not changed to the rigid amorphous phase. For example, the heat-shrinkable polyester-based film described in Patent Document 1 has the problem that the film has an increased secondary shrinkage ratio after being subjected to shrinkage finish while a high shrinkage ratio is easily achieved because there is no significant difference in mobile amorphous content between the unstretched sheet and the film after final heat treatment.

Thus, the present inventors have found conditions for lateral stretching, relaxation after lateral stretching and final heat treatment which ensure that a ratio of change of the mobile amorphous phase to the rigid amorphous phase is appropriate, leading to completion of the present invention. The mobile amorphous content can be determined from a reversing heat capacity curve obtained in the temperature-modulated DSC measurement shown in FIG. 2. In FIG. 2, a baseline shifts at a temperature corresponding to glass transition of the film. A difference between values before and after the shift is called a heat capacity difference $\Delta Cp$, and this difference corresponds to the mobile amorphous content. When $\Delta Cp$ is smaller than 0.12 J/(g·° C.), a heat shrinkage ratio required for shrinkage finish cannot be achieved because the mobile amorphous content is low. $\Delta Cp$ is preferably 0.13 J/(g·° C.) or more, more preferably 0.14 J/(g·° C.) or more. It is not preferable that $\Delta Cp$ is more than 0.25 J/(g·° C.) because secondary shrinkage after shrinkage finish increases. $\Delta Cp$ is preferably 0.23 J/(g·° C.) or less, more preferably 0.21 J/(g·° C.) or less.

2.4 Hot-Water Heat Shrinkage Ratio at 70° C. in Film Longitudinal Direction

When the heat-shrinkable polyester-based film of the present invention is dipped in hot water at 70° C. under a no-load condition for 10 seconds, the film is immediately dipped in water at 25° C.±0.5° C. for 10 seconds, and a heat shrinkage ratio in the film longitudinal direction (direction orthogonal to the main shrinkage direction) is then calculated in accordance with the above-described formula 1 from the lengths before and after shrinkage, the heat shrinkage ratio is preferably −1% or more and 5% or less. The heat shrinkage ratio being smaller than 0% (negative) in the longitudinal direction means that the film is extended along the circumferential direction of a container, and it is not preferable that the heat shrinkage ratio in the longitudinal direction is more than −1% because at the time of performing shrinkage finish, creases are easily generated, leading to a poor external appearance. It is not preferable that the heat shrinkage ratio in the longitudinal direction is more than 5% because distortion easily occurs during shrinkage. The hot-water heat shrinkage ratio at 70° C. in the film longitudinal direction is more preferably in a range of −0.5% to 4.5%, still more preferably in a range of 0% to 4%.

2.5 Absorbance Ratio

In the heat-shrinkable polyester-based film of the present invention, a ratio A1/A2 (hereinafter, referred to as an absorbance ratio) of an absorbance A1 of the heat-shrinkable polyester-based film at 1340 cm-1 to an absorbance A2 of the heat-shrinkable polyester-based film at 1410 cm-1 when each absorbance is measured by a polarized ATR-FTIR method is preferably 0.5 or more and 0.75 or less in a film main shrinkage direction (traverse direction) and 0.35 or more and 0.55 or less in a direction (longitudinal direction) orthogonal to the film main shrinkage direction.

The absorbance ratio represents a trans-conformation ratio of the molecular orientation. The trans-conformation is considered to represent an orientated state of a molecular chain, and when the trans-conformation ratio is high, the molecular chain has a high oriented state. In the present invention, as a result of determining a trans-conformation index from a plurality of absorbance ratios in reference to the document: {Atlas of polymer and plastic analysis: Vch verlagsgesellschaft mbh, 370 (1991)}, the absorbance ratio of the absorbance at 1340 cm-1 to the absorbance at 1410 cm-1 corresponds to the largest difference between values, and therefore this absorbance ratio is determined as a trans-conformation ratio.

In the present invention, the film is stretched in the film traverse direction after being stretched in the film longitudinal direction. A conventional heat-shrinkable film is generally a unidirectionally stretched film stretched in a traverse direction, in such a unidirectionally stretched film, only the orientation in the stretching direction, i.e. only the trans-conformation ratio (absorbance ratio) in the traverse direction increases, and therefore strength in the unstretched direction and tear property as a package are insufficient. In the present invention, the film is stretched in both the longitudinal direction and the traverse direction, the values of trans-conformation ratios in both the directions increase, so that the film has high strength in both the directions, and high tear property as a package.

A high trans-conformation ratio means that the molecular chain is well extended, so that the molecular chain is brought into a high tense state. When the tense state of the molecular chain is high, the molecular chain can stably exist even during aging, and therefore a decrease in shrinkage ratio is reduced. Further, when the tense state of the molecular chain is high, the molecular chain is instantly relaxed during heat shrinkage, and therefore secondary shrinkage after shrinkage may hardly occur.

The absorbance ratio is preferably 0.4 or more and 0.75 or less in the film traverse direction. It is not preferable that the absorbance ratio in the film traverse direction is less than 0.4 because the molecular orientation is low, so that the hot-water heat shrinkage ratio at 70° C. in the film traverse direction after aging decreases, and further, secondary shrinkage increases. When the absorbance ratio in the film traverse direction is less than 0.4, the molecular orientation is low, and therefore it is not preferable that the hot-water heat shrinkage ratio at 70° C. in the film traverse direction after aging decreases, and further, secondary shrinkage increases. The absorbance ratio in the traverse direction is more preferably 0.42 or more, still more preferably 0.44 or more. When the absorbance ratio in the film longitudinal direction is more than 0.75, the molecular orientation becomes extremely high, and therefore it is not preferable that breakage occurs in a film formation step. The absorbance ratio in the traverse direction is more preferably 0.73 or less, still more preferably 0.71 or less.

The absorbance ratio is preferably 0.35 or more and 0.55 or less in the film longitudinal direction. When the absorbance ratio in the film traverse direction is less than 0.35, the molecular orientation is low, and therefore tensile fracture strength in the longitudinal direction decreases, so that right-angle tear strength increases. The absorbance ratio in the traverse direction is more preferably 0.37 or more, still more preferably 0.39 or more. When the absorbance ratio in the film longitudinal direction is more than 0.55, the molecular orientation is high, so that tensile fracture strength in the longitudinal direction increases, and in this respect, it is preferable that the absorbance ratio in the film longitudinal direction is more than 0.55. However, it is not preferable that the absorbance ratio in the film longitudinal direction is more than 0.55 because the hot-water shrinkage ratio at 70° C. in the film longitudinal direction increases. The absorbance ratio in the longitudinal direction is more preferably 0.53 or less, still more preferably 0.51 or less.

2.6 Difference in Enthalpy Relaxation Amount after Aging

Preferably, the heat-shrinkable polyester-based film of the present invention has an enthalpy relaxation amount of 4.0 J/g or less after the film is aged under an atmosphere at 30° C. and 85% RH for 672 hours. From Patent Document 3, and Monograph written by Minoru Totoki ("DSC (3)-Glass Transition Behavior of Polymer-", Fiber and Industry, Vol. 65, No. 10, 2009, p 385-393), it is apparent that in non-reversing heat flows obtained by temperature-modulated DSC measurement as shown in FIG. 3, the endothermic peak observed around the glass transition point shows enthalpy relaxation. The enthalpy relaxation amount can be determined by integrating peak areas. A detailed measurement method will be described later. Enthalpy relaxation is a result of a decrease in free volume of an amorphous part, mobility of molecular chains is accordingly reduced, and therefore the enthalpy relaxation appears as an endothermic peak in a temperature elevation process in DSC. In the heat-shrinkable polyester-based film, as the enthalpy relaxation amount increases, mobility of amorphous molecular chains contributing to shrinkage may be reduced, and shrinkage property tends to be deteriorated. Thus, in the present invention, the enthalpy relaxation amount after aging is preferably 4.0 g/J or less. The enthalpy relaxation amount after aging is more preferably 3.8 g/J or less, still more preferably 3.5 g/J or less. The enthalpy relaxation amount of a film which has not been aged under the above-mentioned conditions is 0.1 g/J or less.

2.7 Tensile Fracture Strength in Film Longitudinal Direction

Preferably, the heat-shrinkable polyester-based film of the present invention has a tensile fracture strength of 80 MPa or more and 200 MPa or less in the film longitudinal direction. A method for measuring tensile fracture strength will be described in examples. It is not preferable that the tensile fracture strength is less than 80 MPa because "stiffness" is reduced in attachment of the film to a bottle etc. as a label. The tensile fracture strength is more preferably 90 MPa or more, still more preferably 100 MPa or more. The tensile fracture strength is preferably as high as possible because "stiffness" increases as the tensile fracture strength becomes higher, and in a film with a molecular design according to the present invention, the upper limit of tensile fracture strength is set to 200 MPa because it is difficult to attain a tensile fracture strength of more than 200 MPa.

2.8 Right-Angle Tear Strength in Film Longitudinal Direction Before Aging

When the heat-shrinkable polyester-based film of the present invention is shrunk by 10% in the traverse direction in hot water at 80° C., and right-angle tear strength per unit thickness in the film longitudinal direction is determined, the right-angle tear strength in the longitudinal direction is preferably 180 N/mm or more and 330 N/mm or less. A method for measuring right-angle tear strength will be described in Examples.

It is not preferable that the right-angle tear strength is less than 180 N/mm because the film may be easily broken by impact from falling during transportation, etc. when it is used as a label. Inversely, it is not preferable that the right-angle tear strength is more than 330 N/mm because the film has poor cutting property (easily tearable property) in the initial stage when a label is torn. The right-angle tear strength is more preferably 185 N/mm or more, still more preferably 190 N/mm or more. The right-angle tear strength is more preferably 325 N/mm or less, still more preferably 320 N/mm or less.

2.9 Other Properties

The thickness of the heat-shrinkable polyester-based film is preferably 10 μm or more and 200 μm or less, more preferably 20 μm or more and 100 μm or less while it is not particularly limited. The haze value of the heat-shrinkable polyester-based film is preferably 2% or more and 13% or less. It is not preferable that the haze value is more than 13% because the film has poor transparency, so that the appearance is deteriorated in preparation of a label. The haze value is more preferably 11% or less, especially preferably 9% or less. The haze value is preferably as small as possible, and the lower limit of the haze value is about 2% considering that a predetermined amount of a lubricant must be added to the film for the purpose of imparting slippage required from a practical point of view.

3. Method for Producing Heat-Shrinkable Polyester-Based Film

The heat-shrinkable polyester-based film of the present invention can be obtained by melting and extruding the polyester raw material by an extruder to form an unstretched film, and biaxially stretching and heat-treating the unstretched film by a predetermined method as shown below. The polyester can be obtained by polycondensation of the preferred dicarboxylic acid component and diol component using a known method. Normally, two or more chip-shaped polyesters are mixed, and the resulting mixture is used as a raw material for the film. The intrinsic viscosity of the polyester that forms the chip is normally 0.50 to 1.30 dl/g while it is not particularly limited.

Preferably, the polyester raw material is dried using a dryer such as a hopper dryer or a paddle dryer, or a vacuum dryer when the raw material resin is melted and extruded. After the polyester raw material is dried as described above, the polyester raw material is melted at a temperature of 200° C. to 300° C., and extruded into a film form using an extruder. In extrusion, any existing method such as a T-die method or a tubular method can be employed.

The sheet-shaped molten resin after extrusion is rapidly cooled to obtain an unstretched film. As a method for rapidly cooling the molten resin, a method can be suitably employed in which the molten resin is cast onto a rotating drum from a mouthpiece, and thus rapidly cooled to obtain a substantially unoriented resin sheet.

Further, as described later, the resulting unstretched film is stretched in the longitudinal direction under a predetermined condition, and then subjected to annealing treatment, and then intermediate heat treatment, and the film after intermediate heat treatment is cooled, then stretched in the traverse direction under a predetermined condition, and further subjected to final heat treatment. In this way, the heat-shrinkable polyester-based film of the present invention can be obtained. Hereinafter, a preferred film formation method for obtaining the heat-shrinkable polyester-based film of the present invention will be described.

As described above, the heat-shrinkable polyester-based film is produced normally by stretching an unstretched film only in a direction along which the film is to be stretched (i.e. main shrinkage direction, normally traverse direction). The present inventors have examined a conventional production method, and resultantly found that when a polyester in which an alcohol component forming the raw material polyester is relatively short with the alcohol component having 3 or less of carbon atoms, and amorphous molecular chains have uniform lengths is used in the conventional method for producing a heat-shrinkable polyester-based film, stress on molecular chains in aging is easily relaxed because the molecular orientation after stretching has a relatively simple structure. Further, when the film is stretched merely in the traverse direction, molecular chains are oriented only in the traverse direction, and therefore the above-mentioned fixing effect is insufficient, leading to an increase in relaxation of molecular chains in aging. In the conventional method for producing a heat-shrinkable polyester-based film, the final heat treatment temperature after lateral stretching is set low to keep the shrinkage ration high because versatility for packaged products becomes higher as the shrinkage ratio of the film increases. When the film has a high shrinkage ratio, versatility is high, but for applications in which a required shrinkage ratio is relatively low as in the case of preforms, excessive shrinkage (so called over performance) occurs to cause secondary shrinkage.

Further, on the basis of the problems in the method for producing a heat-shrinkable polyester-based film, the present inventors have further conducted studies for obtaining a heat-shrinkable polyester-based film having favorable aging resistance and being free from secondary shrinkage, and resultantly arrived at the following findings.

It may be necessary that molecular chains having different lengths be oriented to a certain degree in the traverse direction and the longitudinal direction for improving aging resistance.

It is important to prevent occurrence of secondary shrinkage during cooling for attaining favorable finish after shrinkage and attachment as a label, and for this purpose, it may be necessary that the shrinkage ability of molecules oriented in the traverse direction be reduced to the necessary minimum.

From the above-described findings, the present inventors have come to think that for securing aging resistance and shrinkage finish property, molecular chains having different lengths should be oriented in the traverse direction and the longitudinal direction, and molecular chains oriented in the traverse direction should be prevented from being excessively shrunk. As a result, the present inventors have thought that film production using a so called lengthwise-lateral stretching method in which the film is stretched in the longitudinal direction, and then stretched in the traverse direction, and by taking the following measures, a heat-shrinkable polyester-based film having aging resistance and favorable shrinkage property can be obtained, leading to completion of the present invention.

(1) Control of lengthwise stretching conditions
(2) Intermediate heat treatment after lengthwise stretching
(3) Natural cooling (interruption of heating) between intermediate heat treatment and lateral stretching
(4) Forced cooling of film after natural cooling
(5) Control of lateral stretching conditions
(6) Heat treatment after lateral stretching
(7) Providing step of relaxing a film in longitudinal direction during the production process Hereinafter, the measures described above will be described in order.

(1) Control of Lengthwise Stretching Conditions

In production of a film by a lengthwise-lateral stretching method in the present invention, it is necessary to lengthwise stretch a substantially unoriented film at a ratio of 3.0 or more and 4.5 or less with the temperature set to Tg or higher and Tg+30° C. or lower. Lengthwise stretching may be either single-stage stretching, or multi-stage stretching in two or more stages.

When the total lengthwise stretching ratio increases in stretching of the film in the lengthwise direction, the shrinkage ratio in the longitudinal direction tends to increase, and the molecular orientation in the longitudinal direction can be controlled by intermediate heat treatment after lengthwise stretching and relaxation in the longitudinal direction. However, it is not preferable that the lengthwise stretching ratio is excessively large because orientation and crystallization of the film progresses after lengthwise stretching, so that breakage easily occurs in a lateral stretching step. The upper limit of the lengthwise stretching ratio is more preferably 4.5, still more preferably 4.4. It is not preferable that the lengthwise stretching ratio is excessively small because while the shrinkage ratio in the longitudinal direction decreases, the molecular orientation degree in the longitudinal direction decreases, so that right-angle tear strength in the longitudinal direction increases, leading to a decrease in tensile fracture strength. The lower limit of the lengthwise stretching ratio is more preferably 3.3, still more preferably 3.4.

For example, Patent Document 1 discloses a heat-shrinkable polyester-based film which is hardly whitened in shrinkage, the film containing 1 to 30 mol % of ε-caprolactone and 1 mol % or more of neopentyl glycol and optionally containing butanediol, but in this technique, importance of the molecular orientation in the longitudinal direction is not considered at all, and the stretching ratio in the lengthwise direction is only 1.05 to 1.2 at most (paragraph [0072] in Patent Document 1). In this technique, a heat-shrinkable polyester-based film in which molecules are moderately oriented in the longitudinal direction as considered important in the present invention, and deterioration of performance during aging is small cannot be obtained.

(2) Intermediate Heat Treatment after Lengthwise Stretching

Molecular chains are oriented in the longitudinal direction after a film is lengthwise stretched, and therefore when a subsequent lateral stretching step is carried out in this state, the shrinkage ratio in the longitudinal direction increases. Thus, it is preferable that molecules oriented in the longitudinal direction are heat-relaxed for ensuring that molecular chains which are oriented in the longitudinal direction, and do not contribute to shrinkage exist in the film, and according to common technical knowledge in the art, when the film is subjected to heat treatment at a high temperature between first-axial stretching and second-axial stretching in biaxial stretching of the film, the film after heat treatment is crystallized, and therefore the film cannot be stretched any more. However, by lengthwise stretching the film under a certain condition, performing intermediate heat treatment under a predetermined condition in conformity to the state of the film after the lengthwise stretching, and performing lateral stretching under a predetermined condition in conformity to the state of the film after intermediate heat treatment in a lengthwise-lateral stretching method, molecular chains which are oriented in the longitudinal direction, and do not contribute to a shrinkage force can be made to exist in the film without causing breakage during lateral stretching.

In production of a film by a lengthwise-lateral stretching method in the present invention, it is necessary to perform heat treatment (hereinafter, referred to as intermediate heat treatment) at a temperature of Tg+40° C. or higher and Tg+90° C. or lower with the film held by clips at both ends in the traverse direction in a tenter after lengthwise stretching an unstretched film. It is not preferable that the intermediate heat treatment temperature is lower than Tg+40° C. because a shrinkage force in the longitudinal direction of the film remains, so that the shrinkage ratio in the longitudinal direction of the film increases after lateral stretching. It is not preferable that the intermediate heat treatment temperature is higher than Tg+90° C. because the film surface layer is coarsened, leading to impairment of transparency. The intermediate heat treatment temperature is more preferably Tg+45° C. or higher, still more preferably Tg+50° C. or higher, and more preferably Tg+85° C. or lower, still more preferably Tg+80° C. or lower. Preferably, the intermediate heat treatment temperature is appropriately adjusted by the raw material composition and the stretching ratio in the lengthwise direction.

By setting the intermediate heat treatment temperature to Tg+40° C. or higher, the molecular orientation degree in the longitudinal direction can be kept high to a certain degree, and therefore the tensile fracture strength in the longitudinal direction can be kept large while the right-angle tear strength is kept small. By controlling the intermediate heat treatment temperature to Tg+90° C. or lower, crystallization of the film can be suppressed to maintain stretchability in the longitudinal direction, leading to inhibition of troubles caused by breakage, and also thickness unevenness in the longitudinal direction can be reduced. The intermediate heat treatment time may be appropriately adjusted according to a raw material composition while falling within a range of 3.0 seconds to 12.0 seconds. For intermediate heat treatment, the amount of heat supplied to the film is important, and when the intermediate heat treatment temperature is low, long-time intermediate heat treatment is required. However, when the intermediate heat treatment time is excessively long, equipment is expanded, and therefore it is preferable to appropriately adjust the temperature and the time.

By performing such intermediate heat treatment, molecular chains which are oriented in the longitudinal direction, and do not contribute to shrinkage can be made to exist in the film, and the molecular chains oriented in the longitudinal direction act to fix molecular chains in the traverse direction, so that stress particularly on molecular chains stretched in the traverse direction is not relaxed during aging, and thus a film having excellent aging resistance can be obtained. It is not ensured that molecular chains which are oriented in the longitudinal direction, and do not contribute to shrinkage can be made to exist in the film regardless of how lengthwise stretching is performed, these molecular chains can be made to exist in the film only after intermediate heat treatment by the above-described predetermined lengthwise stretching. By performing predetermined natural cooling, forced cooling and lateral stretching as described later, molecules can be oriented in the traverse direction to exhibit a shrinkage force in the traverse direction while molecules which are formed in the film and which are oriented in the longitudinal direction, and do not contribute to a shrinkage force are retained.

(3) Natural Cooling (Interruption of Heating) Between Intermediate Heat Treatment and Lateral Stretching In production of a film by a lengthwise-lateral stretching method in the present invention, it is necessary to perform intermediate heat treatment after lengthwise stretching, and after the lengthwise stretching and intermediate heat treatment, the film should be made to pass through an intermediate zone where an aggressive heating operation is not carried out, for a time of 0.5 seconds or more and 3.0 seconds or less. Preferably, the intermediate zone is provided in front of a lateral stretching zone in a tenter for lateral stretching, and the film after intermediate heat treatment after lengthwise stretching is guided to the tenter, made to pass through the intermediate zone for a predetermined time, and then laterally stretched. In addition, in the intermediate zone, it is preferable that an accompanying flow associated with running of the film and hot air from the cooling zone are blocked in such a manner that when a strip-shaped paper piece is suspended while the film does not pass through the intermediate zone, the paper piece is suspended downward in an almost completely vertical direction. It is not preferable that the time during which the film passes through the intermediate zone is less than 0.5 seconds, lateral stretching is performed at a high temperature, so that the shrinkage ratio in the lateral direction cannot be sufficiently increased. On the other hand, a time of 3.0 seconds is enough for the film to pass through the intermediate zone, and it is not preferable that the time is set to more than 3.0 seconds because equipment is wasted. The time during which the film passes through the intermediate zone is more preferably 0.7 seconds or more, still more preferably 0.9 seconds or more, and more preferably 2.8 seconds or less, still more preferably 2.6 seconds or less.

(4) Forced Cooling of Film after Natural Cooling

In production of a film by a lengthwise-lateral stretching method in the present invention, it is necessary to rapidly cool the film to a film temperature of Tg+5° C. or higher and Tg+40° C. or lower rather than laterally stretching the naturally cooled film as such. Thickness accuracy of the film can be improved by performing such rapid cooling treatment. The temperature of the film after rapid cooling is more preferably Tg+10° C. or higher, still more preferably Tg+15° C. or higher, and more preferably Tg+35° C. or lower, still more preferably Tg+30° C. or lower.

When in rapid cooling of a film, the temperature of the film after rapid cooling remains above Tg+40° C., thickness accuracy of the film is deteriorated, so that there arises the problem that creases are generated in the film at the time when the film is wound around a roll, etc. By controlling the temperature of the film after rapid cooling to Tg+40° C. or lower, thickness accuracy of the film can be improved. It is not preferable that the temperature of the film after rapid cooling is below Tg+5° C. because stretching stress during lateral stretching increases, leading to an increase in secondary shrinkage ratio of the film.

(5) Control of Lateral Stretching Conditions

In production of a film by a lengthwise-lateral stretching method in the present invention, it is necessary that the film after lengthwise stretching, intermediate heat treatment, natural cooling and rapid cooling be laterally stretched under a predetermined condition. Lateral stretching is performed at a ratio of 3 or more and 6 or less at a temperature of Tg+10° C. or higher and Tg+30° C. or lower with the film held by clips at both ends in the traverse direction in a tenter. By performing lateral stretching under a predetermined condition, molecules can be oriented in the traverse direction to exhibit a shrinkage force in the traverse direction while molecules which are formed by lengthwise stretching and intermediate heat treatment and which are oriented in the longitudinal direction, and do not contribute to a shrinkage force are retained, so that a film having favorable strength in the longitudinal direction as well can be obtained. The lateral stretching temperature is more preferably Tg+12° C. or higher, still more preferably Tg+14° C. or higher, and more preferably Tg+28° C. or lower, still more preferably Tg+26° C. or lower. On the other hand, the lateral stretching ratio is more preferably 3.5 or more, still more preferably 3.7 or more, and more preferably 5.5 or less, still more preferably 5 or less.

When the stretching temperature is above Tg+30° C. in stretching in the lateral direction, thickness accuracy of the film is easily deteriorated, and by controlling the stretching temperature to Tg+30° C. or lower, thickness accuracy of the film can be improved, which is preferable.

On the other hand, when the stretching temperature is below Tg+10° C., the secondary shrinkage ratio increases, and the orientation in the traverse direction excessively increases, so that the film is easily broken during lateral stretching. By controlling the stretching temperature to Tg+10° C. or higher, the secondary shrinkage ratio, and breakage of the film during lateral stretching can be reduced.

(6) Heat Treatment after Lateral Stretching

It is necessary that the film after lateral stretching be finally heat-treated at a temperature of Tg+30° C. or higher and Tg+60° C. or lower for a time of 1 second or more and 9 seconds or less with the film held by clips at both ends in the traverse direction in a tenter. It is not preferable that the heat treatment temperature is higher than Tg+60° C. because the shrinkage ratio in the traverse direction decreases to the extent that the heat shrinkage ratio in the traverse direction at 70° C. is less than 10%. It is not preferable that the heat treatment temperature is lower than Tg+30° C. because the second shrinkage ratio increases. The heat treatment time is preferably as long as possible, but when the heat treatment time is excessively long, equipment is expanded, and therefore the heat treatment time is preferably 9 seconds or less.

(7) Step of Relaxation in Longitudinal Direction

Preferably, molecules oriented in the longitudinal direction are heat-relaxed for ensuring that molecules which are oriented in the longitudinal direction, and do not contribute to a shrinkage force exist in the film as described above. When residual shrinkage stress in the longitudinal direction of the film after lengthwise stretching, there is the disadvantage that the hot-water heat shrinkage ratio in the longitudinal direction of the film after lateral stretching increases, leading to deterioration of shrinkage finish property. It is effective to subject the film to heat treatment in the lateral stretching step for reducing the hot-water heat shrinkage ratio in the film longitudinal direction, but mere relaxation by heat cannot sufficiently reduce the hot-water heat shrinkage ratio in the film longitudinal direction, and a large amount of heat is required. However, when the amount of heat is increased in relaxation by heat, the film is crystallized, and thus stretching stress at the time of stretching the film in the traverse direction increases, so that the film may be broken during lateral stretching.

The present inventors have conducted studies on means for reducing the molecular orientation in the film longitudinal direction so as to satisfy right-angle tear strength and tensile fracture strength, and controlling a shrinkage ratio difference and shrinkage stress in the traverse direction and right-angle tear strength and tensile fracture strength in the longitudinal direction. Resultantly, the present inventors have found that by carrying out at least one of the following steps, the film can be relaxed in the longitudinal direction to perform the above-mentioned control.

(i) The film after lengthwise stretching is heated at a temperature of Tg or higher and Tg+90° C. or lower, and relaxed by 10% or more and 60% or less in the longitudinal direction for a time of 0.05 seconds or more and 5 seconds or less using rolls having a speed difference. As heating means, any of a temperature control roll, a near infrared radiation, a far infrared radiation, a hot air heater and so on can be used.

(ii) In the intermediate heat treatment step, the distance between clips for holding the film in the tenter is reduced to relax the film by 5% or more and 20% or less in the longitudinal direction for a time of 0.1 seconds or more and 12 seconds or less.

(iii) In the final heat treatment step, the distance between clips for holding the film in the tenter is reduced to relax the film by 5% or more and 20% or less in the longitudinal direction for a time of 0.1 seconds or more and 9 seconds or less.

It is most preferable to carry out the step (i) of relaxing the film after lengthwise stretching among the steps (i) to (iii). The step (i) may be combined with the step (ii) or (iii). Hereinafter, the steps will be described.

(i) Relaxation after Lengthwise Stretching

Preferably, the film after lengthwise stretching is heated at a temperature of Tg or higher and Tg+90° C. or lower, and relaxed by 10% or more and 60% or less in the longitudinal direction for a time of 0.05 seconds or more and 5.0 seconds or less using rolls having a speed difference. It is not preferable that the temperature is lower than Tg because the film after lengthwise stretching is not shrunk, and the film cannot be relaxed. On the other hand, it is not preferable that the temperature is higher than Tg+90° C. because the film is crystallized, leading to deterioration of transparency. The film temperature during relaxation after lengthwise stretching is preferably Tg+10° C. or higher and Tg+80° C. or lower, more preferably Tg+20° C. or higher and Tg+70° C. or lower.

The time during which the film after lengthwise stretching is relaxed in the longitudinal direction is preferably 0.05 seconds or more and 5 seconds or less. It is not preferable that the time is less than 0.05 seconds because the relaxation time is so short that relaxation unevenness occurs unless the temperature is set to higher than Tg+90° C. When the relaxation time is longer than 5 seconds, the film can be relaxed at a low temperature, and there is no problem in the film itself, but equipment is expanded, and therefore it is preferable to appropriately adjust the temperature and the time. The relaxation time is more preferably 0.1 seconds or more and 4.5 seconds or less, still more preferably 0.5 seconds or more and 4 seconds or less.

It is not preferable that the relaxation ratio of the lengthwise stretched film in the longitudinal direction is less than 10% because the molecular orientation in the longitudinal direction cannot be sufficiently relaxed, and thus the shrinkage ratio in the longitudinal direction increases to the extent that the heat shrinkage ratio at 70° C. exceeds 4%. It is not preferable that the relaxation ratio of the lengthwise stretched film is more than 60% because right-angle tear strength in the longitudinal direction increases, so that tensile fracture strength decreases. The relaxation ratio of the lengthwise stretched film is more preferably 15% or more and 55% or less, still more preferably 20% or more and 50% or less.

The film after lengthwise stretching can be relaxed by a method in which the film after lengthwise stretching is heated by a heater (heating chamber) provided between rolls, and the film is relaxed by means of a speed difference between rolls, a method in which the film after lengthwise stretching is heated by a heater (heating chamber) provided between a roll and a lateral stretching machine, and the speed of the lateral stretching machine is made lower than the speed of the roll, or the like. As the heater (heating chamber), any of a temperature control roll, a near infrared heater, a far infrared heater, a hot air heater and so on can be used.

(ii) Relaxation in Intermediate Heat Treatment Step

In the intermediate heat treatment step, it is preferable that the distance between clips for holding the film in the tenter is reduced to relax the film by 5% or more and 20% or less in the longitudinal direction for a time of 0.1 seconds or more and 12 seconds or less. It is not preferable that the relaxation ratio is less than 5% because the molecular orientation in the longitudinal direction cannot be sufficiently relaxed, and thus the shrinkage ratio in the longitudinal direction increases to the extent that the heat shrinkage ratio at 70° C. exceeds 4%. When the relaxation ratio is more than 20%, film properties can be adjusted, but it is impossible to set the relaxation ratio to more than 20% in view of equipment, and therefore the upper limit of the relaxation ratio is 20%. The relaxation ratio is more preferably 8% or more, still more preferably 11% or more.

The time during which the film is relaxed in the longitudinal direction in the intermediate heat treatment step is preferably 0.1 seconds or more and 12 seconds or less. It is not preferable that the time is less than 0.1 seconds because the relaxation time is so short that relaxation unevenness occurs unless the temperature is set to higher than Tg+90° C. When the relaxation time is longer than 12 seconds, there is no problem in the film itself, but equipment is expanded, and therefore it is preferable to appropriately adjust the temperature and the time. The relaxation time is more preferably 0.3 seconds or more and 11 seconds or less, still more preferably 0.5 seconds or more and 10 seconds or less.

(iii) Relaxation in Final Heat Treatment Step

In the final heat treatment step, it is preferable that the distance between clips for holding the film in the tenter is reduced to relax the film by 5% or more and 20% or less in the longitudinal direction for a time of 0.1 seconds or more and 9 seconds or less. It is not preferable that the relaxation ratio is less than 5% because the molecular orientation in the longitudinal direction cannot be sufficiently relaxed, and thus the shrinkage ratio in the longitudinal direction increases to the extent that the heat shrinkage ratio at 98° C. exceeds 15%. When the relaxation ratio is more than 20%, film properties can be adjusted, but it is impossible to set the relaxation ratio to more than 20% in view of equipment, and therefore the upper limit of the relaxation ratio is 20%. The relaxation ratio is more preferably 8% or more, still more preferably 11% or more.

The time during which the film is relaxed in the longitudinal direction in the final heat treatment step is preferably 0.1 seconds or more and 9 seconds or less. It is not preferable that the time is less than 0.1 seconds because the relaxation time is so short that relaxation unevenness occurs unless the temperature is set to higher than Tg+50° C. When the relaxation time is longer than 9 seconds, there is no problem in the film itself, but equipment is expanded, and therefore it is preferable to appropriately adjust the temperature and the time. The relaxation time is more preferably 0.3 seconds or more and 8 seconds or less, still more preferably 0.5 seconds or more and 7 seconds or less.

4. Package

A package of the present invention is formed in the following manner: at least a part of the outer periphery of a product to be packaged is covered with a heat-shrinkable film of the present invention, and the heat-shrinkable film is then heat-shrunk. Examples of the product to be packaged may include plastic bottles for storage of food, polyethylene containers to be used for shampoos, conditioners and the like, various kinds of bottles, cans, plastic containers for confectioneries, packed lunches and the like, and paper boxes. A label prepared from a heat-shrinkable polyester-based film does not necessary cover the whole of a container, but may cover a part of the container as in, for example, a configuration in which a cap of a bottle is covered (cap seal), and the label may be a preliminary molded product (preform) before complete adhesion to the container. Normally, when such a product to be packages is covered with a label prepared from a heat-shrinkable polyester-based film while the label is heat-shrunk, the label is heat-shrunk by about 2 to 15%, and adhered to the product to be packaged. A label with which a product to be packaged is covered may be printed, or may not be printed.

As a method for preparing a label, one surface of a rectangular film is coated with an organic solvent slightly inside an end of the film, the film is immediately rounded, and the ends of the film are superposed on each other, and bonded together to form a label, or one surface of a film wound in the form of a roll is coated with an organic solvent slightly inside an end of the film, the film is immediately rounded, the ends of the film are superposed on each other, and bonded together to form a tubular body, and the tubular body is cut to form a label. As the organic solvent for bonding, cyclic ethers such as 1,3-dioxolane or tetrahydrofuran are preferable. Besides, an aromatic hydrocarbon such as benzene, toluene, xylene or trimethylbenzene, a halogenated hydrocarbon such as methylene chloride or chloroform, phenols such as phenol, or a mixture thereof can be used.

EXAMPLES

The present invention will now be described in detail with reference to examples and comparative examples, and the present invention is in no way limited to the aspects of these examples, and changes can be appropriately made without departing from the spirit of the present invention. Methods for evaluation of a film and methods for synthesis of a polyester will be shown below.

[Secondary Shrinkage Ratio]

A sample having a length of 25 mm and a width of 2 mm in a main shrinkage direction was cut out from a heat-shrinkable film which was not placed under an aging environment (hereinafter, merely the "heat-shrinkable film" refers to a heat-shrinkable film which is not placed under an aging environment unless otherwise specified), and measurement was performed using a thermomechanical analyzer (TMA; manufactured by Seiko Instruments Inc.). The sample was attached to a probe using a dedicated chuck. A chuck-to-chuck distance (probe-to-probe distance) was set to 15 mm. A sample was inserted in a chamber kept at 100° C. beforehand, and kept at 100° C. for 36 seconds, air was then fed into the chamber, and the sample was cooled from 100° C. to 25° C. for 3 minutes. A sample length at the start of cooling was set to zero, an amount of displacement of the sample was measured, and a secondary shrinkage ratio was determined in accordance with the following formula 1.

$$\text{secondary shrinkage ratio} = \{\text{length at the start of cooling} - \text{length at 25° C.}\}/\text{length at the start of cooling}\} \times 100(\%) \quad \text{Formula 1}$$

[Absorbance Ratio]

Using a FT-IR apparatus "FTS 60A/896" (manufactured by Varian Company), an infrared absorption spectrum of a heat-shrinkable film was measured in a measurement wave number range of 650 to 4000 cm-1 at a cumulative number of 128 with light polarized in an ATR method. The ratio A1/A2 of an absorbance A1 at 1340 cm-1 to an absorbance A2 at 1410 cm-1 was defined as absorbance ratio.

[Heat Shrinkage Ratio (Hot-Water Heat Shrinkage Ratio)]

A heat-shrinkable film, or a film aged at 30° C. and 85% RH for 672 hours was cut to a square of 10 cm×10 cm, and dipped in hot water at a predetermine temperature±0.5° C. for 10 seconds under a no-load condition to heat-shrink the film, the film was then dipped in water at 25° C.±0.5° C. for 10 seconds, and taken out from the water, and dimensions of the film in lengthwise and lateral directions were measured, and a heat shrinkage ratio in each direction was determined in accordance with the following formula 2. The direction with a larger heat shrinkage ratio was defined as a main shrinkage direction (traverse direction).

$$\text{heat shrinkage ratio} = \{(\text{length before shrinkage} - \text{length after shrinkage})/\text{length before shrinkage}\} \times 100(\%) \quad \text{Formula 2}$$

[Mobile Amorphous Content]

In a temperature-modulated differential scanning calorimeter (DSC) "Q100" (manufactured by TA Instruments Company), 5.0±0.2 mg of a film sample was weighed, and put in a hermetic aluminum pan, and measurement was performed at an average temperature elevation rate of 2.0 T/min and a modulation cycle of 60 seconds in a MDSC (registered trademark) heat-only mode to obtain a reversing heat capacity curve. In the obtained reversing heat capacity curve, an inflection point was determined using attached analysis software (TA Analysis manufactured by TA Instruments Company), and a reversing heat capacity difference before and after the inflection point (glass transition point) was determined in accordance with the following formula 3. Here, the inflection point is a point at which a value obtained by differentiating the reversing heat capacity curve is 0 provided that the reversing heat capacity curve is an ideal curve having no irregularities.

$$\text{reversing heat capacity difference} = (\text{heat capacity on high-temperature side}) - (\text{heat capacity on low temperature side}) \quad \text{Formula 3}$$

Here, in the heat capacity curve, an extended line of a baseline of the heat capacity curve on the high-temperature side from Tg. Here, a line obtained by linearly fitting the baseline of the heat capacity curve in a range of Tg+5° C. to Tg+15° C. by a least square method is defined as an extended line of the baseline of the heat capacity curve on the high-temperature side from Tg. An intersection with a tangential line at an inflection point (Tg) is determined, a value of the intersection on the Y axis (reversing heat capacity) is read, and this value is defined as a heat capacity on the high-temperature side. Next, an extended line of a baseline of the heat capacity curve on the low-temperature side from Tg is drawn. Here, a line obtained by linearly fitting the baseline of the heat capacity curve in a range of Tg−15° C. to Tg−5° C. by a least square method is defined as an extended line of the baseline of the heat capacity curve on the low-temperature side from Tg. An intersection with a tangential line at an inflection point (Tg) is determined, a value of the intersection on the Y axis (reversing heat capacity) is read, and this value is defined as a heat capacity on the low-temperature side. A difference between values of the heat capacity on the high-temperature side and the heat capacity on the low-temperature side was defined as a heat capacity difference ΔCp.

In the reversing heat capacity curve, a baseline shift around Tg occurred without being disordered, and this showed that measurement was normally performed.

[Enthalpy Relaxation Amount]

In a temperature-modulated differential scanning calorimeter (DSC) "Q100" (manufactured by TA Instruments Company), 5.0 mg of a film sample aged under an atmosphere at 30° C. and 85% RH for 672 hours was weighed, and put in a hermetic aluminum pan, measurement was performed at an average temperature elevation rate of 2.0° C./min and a modulation cycle of 60 seconds in a MDSC (registered trademark) heat-only mode to obtain a non-reversing heat flow, and the area of a peak portion around Tg in the non-reversing heat flow was defined as an enthalpy relaxation amount (J/g). Here, the temperature range in determination of the peak area was set to a range between points at which the differential value of the non-reversing heat flow is zero before and after the peak, i.e. points at which the gradient of the non-reversing flow is zero. Measurement examples are shown in FIG. 4.

In a reversing heat flow obtained by performing measurement in the same manner as in the case of the above-mentioned non-reversing heat flow, a baseline shift around Tg occurred without being disordered, and this showed that measurement of the non-reversing heat flow was normally performed.

[Tg]

In a temperature-modulated differential scanning calorimeter (DSC) "Q100" (manufactured by TA Instruments Company), 5.0 mg of a film sample aged under an atmosphere at 30° C. and 85% RH for 672 hours was weighed, and put in a hermetic aluminum pan, measurement was performed at an average temperature elevation rate of 2.0° C./min and a modulation cycle of 60 seconds in a MDSC (registered trademark) heat-only mode to obtain a reversing heat flow, and the reversing heat flow was measured. A tangential line was drawn before and after the inflection point on the obtained reversing heat flow, and the temperature at an intersection between an extended line of the baseline under the glass transition temperature and the tangential line showing a maximum gradient in a transition portion was defined as a glass transition point (Tg; ° C.).

[Tensile Fracture Strength]

A strip-shaped film sample having a size of 140 mm (in measurement direction (film longitudinal direction))×20 mm (in direction orthogonal to measurement direction (film traverse direction)) was prepared in accordance with JIS K7113. In a universal tension tester "DSS-100" (manufactured by Shimadzu Corporation), a test piece was held by a chuck at each of both ends over 20 mm (chuck-to-chuck distance: 100 mm), a tension test was conducted under the condition of an atmospheric temperature of 23° C. and a tension speed of 200 mm/min, and strength (stress) at tensile fracture was defined as tensile fracture strength (MPa).

[Right-Angle Tear Strength]

A film was attached to a rectangular frame having a predetermined length with the film slackened beforehand (i.e. the film was held by the frame at both ends). The film was shrunk by 10% in the traverse direction by immersing the film in hot water at 80° C. for about 5 seconds until the slackened film was brought into a tense state (the film was no longer slackened). In accordance with JIS K7128-3, a test piece having a shape as shown in FIG. 4 was cut out from the film shrunk by 10%. The test piece was cut out from the film so as to make the film longitudinal direction coincident with the tear direction. Next, in a universal tension tester "AUTOGRAPH" (manufactured by Shimadzu Corporation), the test piece was held at both ends (in the traverse direction), a tension test was conducted under the condition of a tension speed of 200 mm/minute, and a maximum load was measured at the time when the film was completely torn in the longitudinal direction. The maximum load was divided by a thickness of the film to calculate right-angle tear strength (N/mm) per unit thickness.

[Shrinkage Finish Property after Aging]

The ends of a heat-shrinkable film were welded with dioxolane to obtain a cylindrical label having a diameter of 7.4 cm and a height of 3.3 cm (label with the circumferential direction corresponding to the main shrinkage direction of the heat-shrinkable film). The label was aged under an atmosphere at 30° C. and 85% RH for 672 hours. Thereafter, a cylindrical mold having a diameter of 7 cm and a height of 3 cm was adjusted to a temperature of 40° C., and the mold was then covered with the cylindrical label as shown in FIG. 5, and hot air was applied at 120° C. (air velocity: 12 m/second) for 60 seconds to heat-shrink the film. Here, the required shrinkage ratio (folded portion in the upper part of the mold) was about 10%. Thereafter, the shrunk label was quickly removed from the mold, and left standing at a room temperature of 25° C. for 10 minutes. The shrinkage finish property of the label was visually evaluated in five grades in accordance with the following criteria.

5: best finish property (no defects)
4: good finish property (one defect)
3: two defects
2: three to five defects
1: many defects (six or more)

The defects mean protrusions, creases, insufficient shrinkage, label end folding, whitening in shrinkage, sink marks and corrugations.

[Perforation Opening Property]

The ends of a heat-shrinkable film were welded with dioxolane to obtain a cylindrical label perforated in a direction orthogonal to the main shrinkage direction (label with the circumferential direction corresponding to the main shrinkage direction of the heat-shrinkable film). The perforation was formed by providing 1 mm-long holes at intervals of 1 mm, and two perforations were provided over a width of 22 mm and a length of 120 mm along the lengthwise direction (height direction) of the label. A barrel portion of a polyethylene container (barrel diameter: 160 mm) adjusted to a temperature of 40° C. was covered with the label, and hot air was applied at 120° C. (air velocity: 12 m/second) for 60 seconds to heat-shrink the label. Thereafter, this bottle was filled with 500 ml of water, and refrigerated at 5° C., and the label of the bottle was torn at the perforation with a fingertip immediately after the bottle was taken out from a refrigerator. The number of bottles for which the label was finely torn lengthwise along the perforation to separate the label from the bottle, and the number of these bottles was subtracted from the total number of samples (50) to calculate a perforation opening failure ratio (%).

[Haze]

A haze of a film was measured in accordance with JIS K7136 using a haze meter "500A" (manufactured by NIPPON DENSHOKU INDUSTRIES Co., Ltd.). The measurement was performed twice, and an average thereof was defined as a haze.

Preparation of Polyester Raw Material

Synthesis Example 1

In a stainless steel autoclave provided with a stirrer, a thermometer and a partial circulation-type cooler, 100 mol % of dimethyl terephthalate (DMT) as a dicarboxylic acid component, and 100 mol % of ethylene glycol (EG) as a polyhydric alcohol component were added in such a manner that a ratio of ethylene glycol to dimethyl terephthalate was 2.2 in terms of a molar ratio, 0.05 mol % (based on the amount of the acid component) of zinc acetate as an ester exchange catalyst, and 0.225 mol % (based on the amount of the acid component) of antimony trioxide as a polycondensation catalyst were added, and an ester exchange reaction was carried out while generated methanol was distilled and removed to outside the system. Thereafter, a polycondensation reaction was carried out under a reduced pressure of 26.7 Pa at 280° C. to obtain a polyester A having an intrinsic viscosity of 0.75 dl/g. The composition thereof is shown in Table 1.

Synthesis Examples 2 to 7

Polyesters B to G as shown in Table 1 were obtained using the same method as in Synthesis Example 1. In production of the polyester F, SiO2 (SILYSIA 266 manufactured by FUJI SILYSIA CHEMICAL LTD.; average particle size: 1.5

μm) was added as a lubricant in a ratio of 7,000 ppm based on the amount of the polyester. In the table, IPA denotes isophthalic acid, NPG denotes neopentyl glycol, CHDM denotes 1,4-cyclohexanedimethanol, BD denotes 1,4-butanediol, ε-CL denotes ε-caprolactone, and DEG denotes diethylene glycol as a by-product. The polyesters B, C, D, E, F and G had intrinsic viscosities of B: 0.72 dl/g, C: 0.80 dl/g, D: 1.20 dl/g, E: 0.77 dl/g, F: 0.75 dl/g and G: 0.78 dl/g, respectively. The polyesters were formed into chip shapes as appropriate.

TABLE 1

| Polyester raw material | Raw material composition of polyester (mol %) | | | | | | | | Added mount of lubricant (ppm) |
|---|---|---|---|---|---|---|---|---|---|
| | Acid component | | Alcohol component | | | | | | |
| | TPA | IPA | EG | BD | NPG | CHDM | DEG | ε-CL | |
| A | 100 | 0 | 99 | — | — | — | 1 | — | |
| B | 100 | 0 | 68 | — | 30 | — | 2 | — | |
| C | 100 | 0 | 67 | — | — | 30 | 3 | — | |
| D | 100 | 0 | — | 100 | — | — | — | — | |
| E | 100 | 0 | — | 55 | — | — | — | 45 | |
| F | 100 | 0 | 99 | — | — | — | 1 | — | 7000 |
| G | 80 | 20 | 85 | 0 | 14 | 0 | 1 | — | |

Example 1

The polyesters A, B, E and F were mixed at a mass ratio of 5:75:15:5, and put in an extruder. The mixed resin was melted at 280° C., extruded from a T die, and wound around a rotating metallic roll cooled to a surface temperature of 30° C. to be rapidly cooled, thereby obtaining a 450 μm-thick unstretched film. The unstretched film had a glass transition temperature ($T_g$) of 60° C.

The obtained unstretched film was guided to a lengthwise stretching machine with a plurality of roll groups arranged serially, where the unstretched film was preheated to a film temperature of 80° C. by a preheating roll, and then stretched at a ratio of 4.1 in the lengthwise direction by means of a rotation speed difference between a low-speed rotating roll set to a surface temperature of 86° C. and a high-speed rotating roll set to a surface temperature of 86° C.

The film immediately after lengthwise stretching was made to pass through a heating chamber. The inside of the heating chamber was heated by a hot-air heater, and the set temperature was 95° C. The film was relaxed by 45% in the longitudinal direction by means of a speed difference between rolls at the entrance and at the exit in the heating chamber. The relaxation time was 0.6 seconds.

The film after relaxation treatment was guided to a lateral stretching machine (tenter), and subjected to intermediate heat treatment at 123° C. The film after intermediate heat treatment was guided to a first intermediate zone, and naturally cooled by causing the film to pass through the zone for 1.0 second. In the first intermediate zone of the tenter, hot air from the intermediate heat treatment zone and cooling air from the cooling zone were blocked in such a manner that when a strip-shaped paper piece was suspended while the film did not pass through the intermediate zone, the paper piece was suspended downward in an almost completely vertical direction. A distance between the film and a shielding plate provided between the intermediate heat treatment zone and the first intermediate zone was adjusted so that a most part of an accompanying flow associated with running of the film was blocked by the shielding plate during running of the film. In addition, the distance between the film and the shielding plate was adjusted so that a most part of an accompanying flow associated with running of the film was blocked by the shielding plate at a boundary between the first intermediate zone and the cooling zone during running of the film.

Subsequently, the film after natural cooling was guided to the cooling zone, and aggressively rapidly cooled by blowing low-temperature air until the film had a surface temperature of 87° C. The film was naturally cooled again by causing the film to pass through a second intermediate zone for 1.0 seconds. Thereafter, in a lateral stretching zone, the film was preheated until the film had a surface temperature of 86° C., and the film was then stretched at a ratio of 4.0 in the traverse direction (lateral direction) at 86° C.

The film after lateral stretching was guided to a final heat treatment zone, and in the final heat treatment zone, the film was heat-treated at 100° C., then cooled, and wound in the form of a roll with a width of 500 mm while both end portions of the film cut and removed. In this way, a biaxially stretched film of thickness of 55 μm was continuously produced over a predetermined length. In this example, the relaxation ratio during intermediate heat treatment and during final heat treatment was set to 0%. The properties of the obtained film were evaluated by the above-mentioned methods. The production conditions are shown in Table 2, and the evaluation results are shown in Table 3. The secondary shrinkage ratio is shown in FIG. 1, the reversing heat capacity obtained from temperature-modulated DSC is shown in FIG. 2, and the non-reversing heat flow flux and reversing heat flow flux obtained from temperature-modulated DSC are shown in FIG. 3. The curve with no mark in FIG. 1, and the curve with no mark in FIG. 2 are associated with Example 1, and the curve with no mark and the curve with mark □ in FIG. 3 correspond to the non-reversing heat flow flux and the reversing heat flow flux, respectively, in Example 1. In the non-reversing heat flow flux, a clear endothermic peak is observed, and this show that enthalpy relaxation occurs. In the reversing heat flow flux curve and reversing heat capacity curve, the baseline is shifted around Tg, and this shows that DSC measurement was normally performed.

Example 2

A polyester raw material identical to that in Example 1 was melted and extruded in the same manner as in Example 1, and lengthwise stretched by a method identical to that in Example 1. The film was guided to an intermediate heat treatment zone without performing a relaxation treatment in the longitudinal direction of the film after lengthwise stretching. The film was subjected to intermediate heat treatment at 123° C., and simultaneously relaxed by 30% in the longitudinal direction. Thereafter, the film was laterally stretched by the same method as in Example 1, and relaxed by 25% in the film longitudinal direction at 100° C. in a final heat treatment step. Accordingly, the relaxation ratio in the film longitudinal direction is 48% in total. A biaxially stretched film having a width of 500 mm and a thickness of 55 μm was obtained. The production conditions are shown in Table 2, and the evaluation results are shown in Table 3.

Example 3

A polyester raw material identical to that in Example 1 was melted and extruded in the same manner as in Example 1, and lengthwise stretched by a method identical to that in Example 1. Thereafter, natural cooling, forced cooling, lateral stretching and final heat treatment were performed in the same manner as in Example 1 except that the film was relaxed by 50% in the film longitudinal direction at 95° C. in a heating chamber, and relaxed by 20% during subsequent intermediate heat treatment. Accordingly, the relaxation ratio in the film longitudinal direction is 60% in total. A biaxially stretched film having a width of 500 mm and a thickness of 55 μm was obtained. The production conditions are shown in Table 2, and the evaluation results are shown in Table 3.

Example 4

A polyester raw material identical to that in Example 1 was melted and extruded in the same manner as in Example 1, and lengthwise stretched by a method identical to that in Example 1. Thereafter, except that the temperature in final heat treatment was 95° C., the same procedure as in example 1 was carried out to continuously produce a biaxially stretched film having a width of 500 mm and a thickness of 55 μm. The production conditions are shown in Table 2, and the evaluation results are shown in Table 3.

Example 5

The polyesters B, E and F were mixed at a mass ratio of 65:30:5, and put in an extruder. The mixed resin was melted and extruded under the same conditions as in Example 1 to form an unstretched film. The unstretched film had Tg of 55° C. Except that for the unstretched film, the film temperature during lengthwise stretching was 80° C., the intermediate heat treatment temperature was 140° C., the film temperature in the lateral stretching zone was 83° C., the same procedure as in example 1 was carried out to continuously produce a biaxially stretched film having a width of 500 mm and a thickness of 55 μm. The production conditions are shown in Table 2, and the evaluation results are shown in Table 3.

Example 6

The polyesters B, C, E and F were mixed at a mass ratio of 18:62:15:5, and put in an extruder. The mixed resin was melted and extruded under the same conditions as in Example 1 to form an unstretched film having a thickness of 450 μm. The unstretched film had Tg of 61° C. Except that for the unstretched film, the intermediate heat treatment temperature was 140° C., the same procedure as in example 1 was carried out to continuously produce a biaxially stretched film having a width of 500 mm and a thickness of 55 μm. The production conditions are shown in Table 2, and the evaluation results are shown in Table 3.

Example 7

Except that the mass ratio of the polyesters A, C, E and F was changed to a mass ratio of 5:80:10:5, the intermediate heat treatment temperature were changed to 140° C., and the final heat treatment temperature were changed to 110° C., the same procedure as in Example 1 was carried out to continuously produce a biaxially stretched film having a width of 500 mm and a thickness of 55 μm. The unstretched film had Tg of 61° C. The production conditions are shown in Table 2, and the evaluation results are shown in Table 3.

Example 8

Except that the mass ratio of the polyesters A, E, F and G was changed to a mass ratio of 5:15:5:75, the same procedure as in Example 1 was carried out to continuously produce a biaxially stretched film having a width of 500 mm and a thickness of 55 μm. The unstretched film had Tg of 59° C. The production conditions are shown in Table 2, and the evaluation results are shown in Table 3.

Example 9

A polyester raw material identical to that in Example 1 was melted and extruded in the same manner as in Example 1, and lengthwise stretched and relaxed by the same method as in Example 1. Subsequently, except that the film after relaxation treatment after transverse stretching was the transverse stretching ratio was 3.0, and laterally stretched at a temperature of 90° C., the same procedure as in Example 1 was carried out to perform lateral stretching, so that a biaxially stretched film having a width of 500 mm and a thickness of 55 μm was produced. The production conditions are shown in Table 2, and the evaluation results are shown in Table 3.

Example 10

A polyester raw material identical to that in Example 1 was melted and extruded in the same manner as in Example 1, and lengthwise stretched and relaxed by the same method as in Example 1 except that the lengthwise stretching ratio was 3.5. Subsequently, except that the film after relaxation treatment after lengthwise stretching was laterally stretched at a temperature of 83° C. the same procedure as in Example 9 was carried out to perform lateral stretching, so that a biaxially stretched film having a width of 500 mm and a thickness of 55 μm was produced. The production conditions are shown in Table 2, and the evaluation results are shown in Table 3.

Comparative Example 1

A polyester raw material identical to that in Example 6 was melted and extruded in the same manner as in Example 6 with the extruder discharge rate adjusted so that an unstretched film had a thickness of 220 μm. Otherwise, the same procedure as in Example 6 was carried out to obtain an unstretched film. Thereafter, the film was not lengthwise stretched, and preheated to 76° C., then stretched at a ratio of 4.0 at 67° C., subjected to final heat treatment at 76° C., then cooled, and wound in the form of a roll with a width of 500 mm while both end portions of the film cut and removed. In this way, a 55 μm-thick uniaxially stretched film was continuously produced over a predetermined length. The production conditions are shown in Table 2, and the evaluation results are shown in Table 3.

Comparative Example 2

A polyester raw material identical to that in Example 1 was melted and extruded in the same manner as in Example 1, and lengthwise stretched by a method identical to that in Example 1. Thereafter, lateral stretching was performed by the same method as in examples, and except that the temperature in final heat treatment was 86° C., the same procedure as in example 1 was carried out to continuously produce a biaxially stretched film having a width of 500 mm and a thickness of 55 μm. The production conditions are shown in Table 2, and the evaluation results are shown in Table 3. The secondary shrinkage ratio is shown in FIG. 1, and the reversing heat capacity obtained from temperature-modulated DSC is shown in FIG. 2. The curve with mark ○ in FIG. 1, and the curve with mark ○ in FIG. 2 are associated with Comparative Example 2. In the reversing heat capacity curve, the baseline is shifted around Tg, and this shows that DSC measurement was normally performed.

Comparative Example 3

Except that the mass ratio of the polyesters A, B, D and F was changed to a mass ratio of 10:75:10:5, the same procedure as in Example 1 was carried out to obtain an unstretched film, and the unstretched film was lengthwise stretched by the same method as in Example 1. The unstretched film had Tg of 70° C. The film after lengthwise stretching was made to pass through a heating chamber at a temperature of 105° C., so that the film was relaxed by 40% in the longitudinal direction. Thereafter, except that the intermediate heat treatment temperature was 130° C., the cooling temperature was 103° C., the lateral stretching temperature was 100° C., and the final heat treatment temperature was 140° C., the same procedure as in example 1 was carried out to produce a biaxially stretched film having a width of 500 mm and a thickness of 55 μm. The production conditions are shown in Table 2, and the evaluation results are shown in Table 3.

Comparative Example 4

A polyester raw material identical to that in Comparative Example 3 was melted and extruded in the same manner as in Example 1 with the extruder discharge rate adjusted so that an unstretched film had a thickness of 220 μm. Otherwise, the same procedure as in Example 1 was carried out to obtain an unstretched film. Thereafter, the film was not lengthwise stretched, and preheated to 95° C., then stretched at a ratio of 4.0 at 90° C., subjected to final heat treatment at 91° C., then cooled, and wound in the form of a roll with a width of 500 mm while both end portions of the film cut and removed. In this way, a 55 μm-thick uniaxially stretched film was continuously produced over a predetermined length. The production conditions are shown in Table 2, and the evaluation results are shown in Table 3. The non-reversing heat flow flux and reversing heat flow flux obtained from temperature-modulated DSC are shown in FIG. 3. The curve with mark ○ and the curve with mark A in FIG. 3 correspond to the non-reversing heat flow flux and the reversing heat flow flux, respectively, in Comparative Example 4. In the non-reversing heat flow flux curve, a clear endothermic peak is observed, and this show that enthalpy relaxation occurs. In the reversing heat flow flux curve, the baseline is shifted around Tg, and this shows that DSC measurement was normally performed.

TABLE 2

| | | Example 1 | Example 2 | Example 3 | Example 4 | Example 5 | Example 6 | Example 7 |
|---|---|---|---|---|---|---|---|---|
| Raw material composition of film (mass %) | Polyester A | 5 | 5 | 5 | 5 | — | — | 5 |
| | Polyester B | 75 | 75 | 75 | 75 | 65 | 18 | — |
| | Polyester C | — | — | — | — | — | 62 | 80 |
| | Polyester D | — | — | — | — | — | — | — |
| | Polyester E | 15 | 15 | 15 | 15 | 30 | 15 | 10 |
| | Polyester F | 5 | 5 | 5 | 5 | 5 | 5 | 5 |
| | Polyester G | 0 | 0 | 0 | 0 | 0 | 0 | 0 |
| Amount of amorphous component (mol %) | | 22.0 | 22.0 | 22.0 | 22.0 | 18.6 | 23.3 | 23.5 |
| Amount of butanediol (mol %) | | 9.5 | 9.5 | 9.5 | 9.5 | 21.4 | 9.9 | 6.4 |
| Amount of ε-caprolactone (mol %) | | 7.8 | 7.8 | 7.8 | 7.8 | 18.3 | 8.1 | 5.2 |
| Amount of ethylene glycol monomer (mol %) | | 59.7 | 59.7 | 59.7 | 59.7 | 46.8 | 56.8 | 63.6 |
| Grass transition temperature Tg (° C.) | | 60 | 60 | 60 | 60 | 55 | 61 | 61 |
| Lubricant | Average particle diameter (μm) | 1.5 | 1.5 | 1.5 | 1.5 | 1.5 | 1.5 | 1.5 |
| | Added amount (mass %) | 0.042 | 0.042 | 0.042 | 0.042 | 0.042 | 0.042 | 0.042 |
| Lengthwise drawing | Drawing temperature (° C.) | 86 | 86 | 86 | 86 | 80 | 86 | 86 |
| | Drawing ratio | 4.1 | 4.1 | 4.1 | 4.1 | 4.1 | 4.1 | 4.1 |
| Relaxation after lengthwise drawing | Temperature of furnace (° C.) | 95 | 95 | 95 | 95 | 95 | 95 | 95 |
| | Relaxation ratio (%) | 45 | 0 | 50 | 45 | 45 | 45 | 45 |
| Transverse drawing | Intermediate heat treatment (preheating) | Temperature | 123 | 123 | 123 | 123 | 140 | 140 | 140 |
| | | Relaxation ratio (%) | 0 | 30 | 20 | 0 | 0 | 0 | 0 |
| | Cooling zone | Temperature | 87 | 87 | 87 | 87 | 87 | 87 | 87 |
| | Drawing zone | Temperature | 86 | 86 | 86 | 86 | 83 | 86 | 86 |
| | | Ratio | 4.0 | 4.0 | 4.0 | 4.0 | 4.0 | 4.0 | 4.0 |
| | Final heat treatment | Temperature | 100 | 100 | 100 | 95 | 100 | 100 | 110 |
| | | Relaxation ratio (%) | 0 | 25 | 0 | 0 | 0 | 0 | 0 |

| | | Example 8 | Example 9 | Example 10 | Comparative Example 1 | Comparative Example 2 | Comparative Example 3 | Comparative Example 4 |
|---|---|---|---|---|---|---|---|---|

TABLE 2-continued

|  |  |  |  |  |  |  |  |  |
|---|---|---|---|---|---|---|---|---|
| Raw material composition of film (mass %) | Polyester A | 5 | 5 | 5 | — | 5 | 10 | 10 |
|  | Polyester B | — | 75 | 75 | 18 | 75 | 75 | 75 |
|  | Polyester C | — | — | — | 62 | — | — | — |
|  | Polyester D | — | — | — | — | — | 10 | 10 |
|  | Polyester E | 15 | 15 | 15 | 15 | 15 | — | — |
|  | Polyester F | 5 | 5 | 5 | 5 | 5 | 5 | 5 |
|  | Polyester G | 75 | 0 | 0 | 0 | 0 | 0 | 0 |
| Amount of amorphous component (mol %) |  | 26.7 | 22.0 | 22.0 | 23.2 | 22.0 | 22.7 | 22.7 |
| Amount of butanediol (mol %) |  | 8.3 | 9.5 | 9.5 | 9.9 | 9.5 | 9.4 | 9.4 |
| Amount of ε-caprolactone (mol %) |  | 6.8 | 7.8 | 7.8 | 8.1 | 7.8 | 0.0 | 0.0 |
| Amount of ethylene glycol monomer (mol %) |  | 74.3 | 59.7 | 59.7 | 46.8 | 59.7 | 66.9 | 66.9 |
| Grass transition temperature Tg (° C.) |  | 59 | 60 | 60 | 61 | 60 | 70 | 70 |
| Lubricant | Average particle diameter (μm) | 1.5 | 1.5 | 1.5 | 1.5 | 1.5 | 1.5 | 1.5 |
|  | Added amount (mass %) | 0.042 | 0.042 | 0.042 | 0.042 | 0.042 | 0.042 | 0.042 |
| Lengthwise drawing | Drawing temperature (° C.) | 86 | 86 | 86 | — | 86 | 86 | — |
|  | Drawing ratio | 4.1 | 4.1 | 3.5 | — | 4.1 | 4.1 | — |
| Relaxation after lengthwise drawing | Temperature of furnace (° C.) | 95 | 95 | 95 | — | 95 | 105 | — |
|  | Relaxation ratio (%) | 45 | 45 | 45 | — | 45 | 40 | — |
| Transverse drawing | Intermediate heat treatment (preheating) | Temperature | 123 | 123 | 123 | 76 | 123 | 130 | 95 |
|  |  | Relaxation ratio (%) | 0 | 0 | 0 | 0 | 0 | 0 | 0 |
|  | Cooling zone | Temperature | 87 | 87 | 87 | — | 87 | 103 | — |
|  | Drawing zone | Temperature | 86 | 90 | 83 | 67 | 86 | 100 | 90 |
|  |  | Ratio | 4.0 | 3.0 | 3.0 | 4.0 | 4.0 | 4.0 | 4.0 |
|  | Final heat treatment | Temperature | 100 | 100 | 100 | 76 | 86 | 140 | 91 |
|  |  | Relaxation ratio (%) | 0 | 0 | 0 | 0 | 0 | 0 | 0 |

TABLE 3

|  |  | Example 1 | Example 2 | Example 3 | Example 4 | Example 5 | Example 6 | Example 7 |
|---|---|---|---|---|---|---|---|---|
| Secondaty shrinkage (%) | Width direction | 3.3 | 3.1 | 3.5 | 4.7 | 4.4 | 2.9 | 2.2 |
| Hot-water shrinkage at 70° C. (%) | Width direction | 14.9 | 15.3 | 17.6 | 23.0 | 22.5 | 13.1 | 10.1 |
| Hot-water shrinkage at 70° C. (%) | Longitudinal direction | 0.1 | 2.6 | −0.7 | 0.2 | 2.8 | −0.1 | −0.3 |
| Heat capacity difference around Tg [Δ $C_p$] (J/g · ° C.) |  | 0.16 | 0.19 | 0.18 | 0.22 | 0.24 | 0.15 | 0.12 |
| Absorbancy ratio | Longitudinal direction | 0.44 | 0.51 | 0.40 | 0.48 | 0.48 | 0.51 | 0.51 |
|  | Width direction | 0.70 | 0.74 | 0.73 | 0.74 | 0.63 | 0.69 | 0.71 |
| Hot-water shrinkage at 70° C. after aging (%) | Width direction | 15.3 | 15.5 | 17.9 | 22.9 | 22.7 | 13.0 | 7.7 |
| Enthalpy relaxation amount before aging (J/g) |  | 0.0 | 0.0 | 0.0 | 0.1 | 0.1 | 0.0 | 0.0 |
| Enthalpy relaxation amount after aging (J/g) |  | 2.2 | 2.1 | 3.2 | 2.4 | 1.5 | 1.1 | 0.8 |
| Shrinkage finish property after aging |  | 5 | 5 | 5 | 4 | 4 | 5 | 4 |
| Tensile breaking strength (MPa) | Longitudinal direction | 113 | 121 | 110 | 120 | 114 | 95 | 133 |
| Right-angled tearing strength (N/mm) | Longitudinal direction | 291 | 284 | 297 | 288 | 290 | 313 | 278 |
| Perforation opening defective ratio (%) |  | 11 | 9 | 12 | 13 | 11 | 15 | 9 |
| Haze (%) |  | 6.7 | 7 | 6.9 | 6.2 | 6.5 | 6.6 | 7.2 |

|  |  | Example 8 | Example 9 | Example 10 | Comparative Example 1 | Comparative Example 2 | Comparative Example 3 | Comparative Example 4 |
|---|---|---|---|---|---|---|---|---|
| Secondaty shrinkage (%) | Width direction | 3.6 | 2.5 | 3.0 | 5.8 | 6.3 | 1.8 | 5.1 |
| Hot-water shrinkage at 70° C. (%) | Width direction | 19.5 | 10.4 | 13.2 | 44.0 | 43.0 | 6.2 | 28.1 |
| Hot-water shrinkage at 70° C. (%) | Longitudinal direction | 1.3 | 0.0 | −0.6 | −0.8 | 2.0 | 0.1 | −2.8 |
| Heat capacity difference around Tg [Δ $C_p$] (J/g · ° C.) |  | 0.18 | 0.13 | 0.18 | 0.32 | 0.25 | 0.10 | 0.27 |
| Absorbancy ratio | Longitudinal direction | 0.40 | 0.45 | 0.38 | 0.15 | 0.59 | 0.60 | 0.12 |
|  | Width direction | 0.68 | 0.52 | 0.55 | 0.70 | 0.62 | 0.84 | 0.93 |
| Hot-water shrinkage at | Width | 19.9 | 9.3 | 12.5 | 42.2 | 41.3 | 6.3 | 13.4 |

| | | | | | | | | |
|---|---|---|---|---|---|---|---|---|
| 70° C. after aging (%) | direction | | | | | | | |
| Enthalpy relaxation amount before aging (J/g) | | 0.1 | 0.0 | 0.0 | 0.0 | 0.0 | 0.0 | 0.1 |
| Enthalpy relaxation amount after aging (J/g) | | 2.0 | 2.8 | 3.4 | 1.8 | 2.6 | 1.6 | 4.2 |
| Shrinkage finish property after aging | | 5 | 4 | 5 | 2 | 2 | 1 | 2 |
| Tensile breaking strength (MPa) | Longitudinal direction | 115 | 108 | 93 | 53 | 107 | 144 | 50 |
| Right-angled tearing strength (N/mm) | Longitudinal direction | 295 | 300 | 320 | 440 | 280 | 217 | 425 |
| Perforation opening defective ratio (%) | | 11 | 13 | 20 | 45 | 12 | 8 | 40 |
| Haze (%) | | 6.6 | 5.8 | 5.9 | 6.8 | 6.5 | 13.5 | 5.3 |

The heat-shrinkable film in each of examples of the present invention is a biaxially stretched film produced by passing through a predetermined relaxation step with butanediol and ε-caprolactone used in a predetermined amount. The heat-shrinkable film showed small secondary shrinkage, and small deterioration of heat shrinkage property during aging, and was excellent in shrinkage finish property of a label after aging.

In Comparative Examples 1, 2 and 4, the heat setting temperature was low, and therefore the film had a high secondary shrinkage ratio of 5.8%, resulting in poor shrinkage finish property. Particularly in Comparative Examples 1 and 4, molecular chains were not oriented in the longitudinal direction, and therefore the absorbance ratio and tensile fracture strength in the longitudinal direction did not satisfy the requirements specified in the present invention. Particularly in Comparative Example 4, since ε-caprolactone was not used, and lengthwise stretching and relaxation in the longitudinal direction were not performed, the absorbance ratio in the traverse direction was excessively high, so that heat shrinkage property during aging was considerably deteriorated, resulting in poor shrinkage finish property of a label after aging.

On the other hand, the heat-shrinkable film in Comparative Example 3 is produced by passing through biaxially stretching and relaxation steps with use of ε-caprolactone, and this example has an extremely high heat setting temperature of 140° C. In this example, the heat setting temperature exceeded Tg+60° C., and therefore even before aging, the shrinkage ratio in the traverse direction at 70° C. was 10% or less, resulting in poor shrinkage finish property.

INDUSTRIAL APPLICABILITY

The heat-shrinkable polyester-based film of the present invention has excellent properties as described above, and therefore can be suitably used for labels of bottles etc. A package such as bottle obtained with use of the heat-shrinkable polyester-based film of the present invention as a label has a beautiful external appearance.

DESCRIPTION OF REFERENCE SIGNS

1: Tangential line at inflection point (Tg)
2: Extended line of baseline of heat capacity curve on high-temperature side from Tg
3: Extended line of baseline of heat capacity curve on low-temperature side from Tg
F: Film

The invention claimed is:

1. A heat-shrinkable polyester-based film comprising ethylene terephthalate units, constituent units derived at least one monomer which forms an amorphous component and constituent units derived from butanediol,
    wherein an amount of the constituent units derived at least one monomer which forms an amorphous component are 18 mol % or more and an amount of the constituent units derived from butanediol are 1 to 25 mol % based on 100 mol % of all polyester resin components,
    wherein the heat-shrinkable polyester-based film satisfies the following requirements (1) to (3):
    (1) the secondary shrinkage ratio of the film is 2% or more and 5% or less when the film is cooled to 25° C. from 100° C. after being primarily shrunk in a chamber kept at 100° C. beforehand;
    (2) the hot-water heat shrinkage ratio of the film in the traverse direction is 10% or more and 30% or less when the film is dipped in hot water at 70° C. for 10 seconds after being aged under an atmosphere at 30° C. and 85% RH for 672 hours; and
    (3) the reversing heat capacity difference before and after the glass transition temperature of the film is 0.12 J/g·° C. or more and 0.25 J/g·° C. or less when the reversing heat capacity difference is measured by temperature-modulated DSC.

2. The heat-shrinkable polyester-based film according to claim 1,
    wherein the film further comprise constituent units derived from ε-caprolactone and constituent units derived from at least one monomer which forms an amorphous component, other than constituent units derived from butanediol and ε-caprolactone,
    wherein an amount of the constituent units derived from ε-caprolactone are 1 to 25 mol % and an amount of the constituent units derived from at least one monomer which forms an amorphous component, other than constituent units derived from butanediol and ε-caprolactone are 18 mol % or more based on 100 mol % of all polyester resin components.

3. The heat-shrinkable polyester-based film according to claim 2,
    wherein the hot-water heat shrinkage ratio of the film in the longitudinal direction is −1% or more and 5% or less when the film is dipped in hot water at 70° C. for 10 seconds.

4. The heat-shrinkable polyester-based film according to claim 3,
    wherein a ratio A1/A2 (absorbance ratio) of an absorbance A1 at 1340 cm-1 to an absorbance A2 at 1410 cm-1 when each absorbance is measured by a polarized ATR-FTIR method is 0.5 or more and 0.75 or less in the traverse direction and 0.35 or more and 0.55 or less in the longitudinal direction.

5. The heat-shrinkable polyester-based film according to claim 4, wherein the tensile fracture strength in the longitudinal direction is 80 MPa or more and 200 MP or less.

6. The heat-shrinkable polyester-based film according to claim 5, wherein the right-angle tear strength per unit thickness in the film longitudinal direction is 180 N/mm or more and 330 N/mm or less after the film is shrunk by 10% in the traverse direction in hot water at 80° C.

7. A package obtained by covering at least a part of an outer periphery of a product to be packaged with the heat-shrinkable film according to claim 6, and then heat-shrinking the heat-shrinkable film.

8. The heat-shrinkable polyester-based film according to claim 1, wherein the hot-water heat shrinkage ratio of the film in the longitudinal direction is −1% or more and 5% or less when the film is dipped in hot water at 70° C. for 10 seconds.

9. The heat-shrinkable polyester-based film according to claim 1, wherein a ratio A1/A2 (absorbance ratio) of an absorbance A1 at 1340 cm-1 to an absorbance A2 at 1410 cm-1 when each absorbance is measured by a polarized ATR-FTIR method is 0.5 or more and 0.75 or less in the traverse direction and 0.35 or more and 0.55 or less in the longitudinal direction.

10. The heat-shrinkable polyester-based film according to claim 1, wherein the tensile fracture strength in the longitudinal direction is 80 MPa or more and 200 MP or less.

11. The heat-shrinkable polyester-based film according to claim 1, wherein the right-angle tear strength per unit thickness in the film longitudinal direction is 180 N/mm or more and 330 N/mm or less after the film is shrunk by 10% in the traverse direction in hot water at 80° C.

12. A package obtained by covering at least a part of an outer periphery of a product to be packaged with the heat-shrinkable film according to claim 1, and then heat-shrinking the heat-shrinkable film.

* * * * *